(12) United States Patent
Rieger et al.

(10) Patent No.: US 9,706,234 B2
(45) Date of Patent: Jul. 11, 2017

(54) GENERATION, DISTRIBUTION AND USE OF CONTENT METADATA IN A NETWORK

(71) Applicant: Time Warner Cable Enterprises LLC, New York, NY (US)

(72) Inventors: Remi Rieger, Charlotte, NC (US); Paul D. Brooks, Weddington, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 58 days.

(21) Appl. No.: 14/148,591

(22) Filed: Jan. 6, 2014

(65) Prior Publication Data

US 2014/0310761 A1    Oct. 16, 2014

Related U.S. Application Data

(62) Division of application No. 11/881,009, filed on Jul. 24, 2007, now Pat. No. 8,625,607.

(51) Int. Cl.

| | |
|---|---|
| *H04N 21/2385* | (2011.01) |
| *H04H 20/42* | (2008.01) |
| *H04H 20/78* | (2008.01) |
| *H04H 60/73* | (2008.01) |
| *H04N 7/22* | (2006.01) |
| *H04N 21/235* | (2011.01) |
| *H04N 21/236* | (2011.01) |

(Continued)

(52) U.S. Cl.
CPC ........ *H04N 21/2385* (2013.01); *H04H 20/42* (2013.01); *H04H 20/78* (2013.01); *H04H 60/73* (2013.01); *H04N 7/22* (2013.01); *H04N 21/2353* (2013.01); *H04N 21/23608* (2013.01); *H04N 21/23655* (2013.01); *H04N 21/4344* (2013.01); *H04N 21/6377* (2013.01); *H04N 21/658* (2013.01)

(58) Field of Classification Search
CPC .. H04J 3/17; H04J 3/1688; H04L 1/00; H04L 12/28; H04L 29/06027; H04N 7/173; H04N 21/235; H04N 21/2353; H04N 21/2385; H04N 7/18; H94N 7/16
See application file for complete search history.

(56) References Cited

U.S. PATENT DOCUMENTS

| | | |
|---|---|---|
| 4,594,708 A | 6/1986 | Servel et al. |
| 4,760,442 A | 7/1988 | O'Connell et al. |

(Continued)

FOREIGN PATENT DOCUMENTS

WO    WO-0110125 A1    2/2001

*Primary Examiner* — Andrew Lai
*Assistant Examiner* — Leon Andrews
(74) *Attorney, Agent, or Firm* — Gazdzinski & Associates, PC

(57) ABSTRACT

Methods and apparatus for utilizing information (e.g., metadata) relating to content in a multimedia distribution network. In one embodiment, the network comprises a hybrid fiber coax (HFC) cable network, and the information comprises metadata relating to the bitrate profile of deterministic content such as stored video. Content sources, or the network operator themselves, generate the metadata which may then be used by the operator to adjust or optimize the operation of the network; e.g., more efficiently allocate the program to a multiplex. Network apparatus adapted to implement the metadata functionality and related business methods are also disclosed.

27 Claims, 12 Drawing Sheets

(51) Int. Cl.
*H04N 21/2365* (2011.01)
*H04N 21/434* (2011.01)
*H04N 21/6377* (2011.01)
*H04N 21/658* (2011.01)

(56) References Cited

U.S. PATENT DOCUMENTS

| | | |
|---|---|---|
| 5,208,692 A | 5/1993 | McMahon |
| 5,488,609 A | 1/1996 | Hluchyj et al. |
| 5,581,544 A | 12/1996 | Hamada et al. |
| 5,594,491 A | 1/1997 | Hodge et al. |
| 5,606,359 A | 2/1997 | Youden et al. |
| 5,650,825 A | 7/1997 | Naimpally et al. |
| 5,682,195 A | 10/1997 | Hendricks et al. |
| 5,708,664 A | 1/1998 | Budge et al. |
| 5,708,961 A | 1/1998 | Hylton et al. |
| 5,754,783 A | 5/1998 | Mendelson et al. |
| 5,818,438 A | 10/1998 | Howe et al. |
| 5,825,779 A | 10/1998 | Putnins et al. |
| 5,826,166 A | 10/1998 | Brooks et al. |
| 5,838,686 A * | 11/1998 | Ozkan ............... H04J 3/1688 370/433 |
| 5,862,140 A | 1/1999 | Shen et al. |
| 5,872,588 A | 2/1999 | Aras et al. |
| 5,917,830 A | 6/1999 | Chen et al. |
| 5,944,795 A | 8/1999 | Civanlar |
| 5,956,088 A | 9/1999 | Shen et al. |
| 6,005,620 A | 12/1999 | Yang et al. |
| 6,014,369 A | 1/2000 | Takahasahi |
| 6,038,256 A | 3/2000 | Linzer et al. |
| 6,047,007 A | 4/2000 | Munday et al. |
| 6,052,384 A | 4/2000 | Huang et al. |
| 6,072,982 A | 6/2000 | Haddad |
| 6,118,976 A | 9/2000 | Arias et al. |
| 6,167,432 A | 12/2000 | Jiang |
| 6,192,083 B1 | 2/2001 | Linzer et al. |
| 6,198,478 B1 | 3/2001 | Ota et al. |
| 6,205,525 B1 | 3/2001 | Korst |
| 6,216,710 B1 | 4/2001 | Gray et al. |
| 6,219,358 B1 | 4/2001 | Pinder et al. |
| 6,259,733 B1 | 7/2001 | Kaye et al. |
| 6,285,716 B1 | 9/2001 | Knee et al. |
| 6,337,849 B1 | 1/2002 | Smith et al. |
| 6,480,521 B1 | 11/2002 | Odenwalder et al. |
| 6,510,556 B1 | 1/2003 | Kusaba et al. |
| 6,577,682 B1 | 6/2003 | Brightwell et al. |
| 6,642,966 B1 | 11/2003 | Limaye |
| 6,674,804 B1 | 1/2004 | Eshet et al. |
| 6,771,657 B1 | 8/2004 | Elstermann |
| 6,785,558 B1 | 8/2004 | Stratford et al. |
| 6,792,045 B2 | 9/2004 | Matsumura et al. |
| 6,795,506 B1 | 9/2004 | Zhang et al. |
| 6,807,528 B1 | 10/2004 | Truman et al. |
| 6,813,270 B1 | 11/2004 | Oz et al. |
| 6,856,786 B2 | 2/2005 | Belostotsky et al. |
| 6,889,382 B1 | 5/2005 | Anderson |
| 6,894,973 B1 | 5/2005 | Mishra |
| 6,895,544 B1 | 5/2005 | Park et al. |
| 6,909,726 B1 | 6/2005 | Sheeran |
| 6,924,847 B2 | 8/2005 | Choi et al. |
| 6,937,619 B1 | 8/2005 | Strasman et al. |
| 6,959,042 B1 | 10/2005 | Liu et al. |
| 6,963,544 B1 | 11/2005 | Balachandran et al. |
| 6,996,129 B2 | 2/2006 | Krause et al. |
| 7,003,790 B1 | 2/2006 | Inoue et al. |
| 7,009,997 B2 | 3/2006 | Huang et al. |
| 7,012,891 B1 | 3/2006 | Chandran et al. |
| 7,016,337 B1 | 3/2006 | Wu et al. |
| 7,027,460 B2 | 4/2006 | Iyer et al. |
| 7,058,087 B1 | 6/2006 | Oz et al. |
| 7,068,724 B1 | 6/2006 | Hamilton |
| 7,089,577 B1 | 8/2006 | Rakib et al. |
| 7,092,356 B2 | 8/2006 | Rabie et al. |
| 7,103,047 B1 | 9/2006 | Wingfield |
| 7,130,310 B2 | 10/2006 | Itawaki et al. |
| 7,162,531 B2 | 1/2007 | Paz et al. |
| 7,173,947 B1 | 2/2007 | Ramakrishnan et al. |
| 7,174,384 B2 | 2/2007 | Cheung et al. |
| 7,174,385 B2 | 2/2007 | Li |
| 7,228,154 B2 | 6/2007 | Champion et al. |
| 7,248,590 B1 | 7/2007 | Liu |
| 7,251,275 B2 | 7/2007 | Wu |
| 7,254,176 B2 | 8/2007 | Chang |
| 7,254,608 B2 | 8/2007 | Yeager et al. |
| 7,263,126 B2 | 8/2007 | Zhao |
| 7,266,133 B2 | 9/2007 | Wu |
| 7,280,609 B2 | 10/2007 | Dottling |
| 7,283,803 B2 | 10/2007 | Karaoguz et al. |
| 7,286,571 B2 | 10/2007 | Mailhot et al. |
| 7,292,602 B1 | 11/2007 | Liu |
| 7,325,073 B2 | 1/2008 | Shao et al. |
| 7,333,515 B1 | 2/2008 | Ramakrishnan et al. |
| 7,349,386 B1 | 3/2008 | Gou |
| 7,376,130 B2 | 5/2008 | Farmwald |
| 7,376,159 B1 | 5/2008 | Stanger et al. |
| 7,376,386 B2 | 5/2008 | Phillips et al. |
| 7,499,462 B2 | 3/2009 | MacMullan et al. |
| 7,602,820 B2 | 10/2009 | Helms et al. |
| 7,835,437 B1 | 11/2010 | Zhang et al. |
| 2001/0055336 A1 | 12/2001 | Krause et al. |
| 2002/0032754 A1 | 3/2002 | Logston et al. |
| 2002/0059619 A1 | 5/2002 | Lebar |
| 2002/0059626 A1 | 5/2002 | Lemmons |
| 2002/0085584 A1 | 7/2002 | Itawaki et al. |
| 2002/0087995 A1 | 7/2002 | Pedlow |
| 2002/0094031 A1 | 7/2002 | Ngai et al. |
| 2002/0101921 A1 | 8/2002 | Golin |
| 2002/0124258 A1 * | 9/2002 | Fritsch ............... H04N 7/17336 725/88 |
| 2002/0129374 A1 | 9/2002 | Freeman et al. |
| 2002/0144260 A1 | 10/2002 | Devara |
| 2002/0146023 A1 | 10/2002 | Myers |
| 2002/0147771 A1 | 10/2002 | Traversat et al. |
| 2002/0147991 A1 | 10/2002 | Furlan et al. |
| 2002/0152299 A1 | 10/2002 | Traversat et al. |
| 2002/0156915 A1 | 10/2002 | Haggar et al. |
| 2002/0162109 A1 | 10/2002 | Shteyn |
| 2002/0166121 A1 | 11/2002 | Rovira |
| 2002/0181044 A1 | 12/2002 | Kuykendall |
| 2003/0002577 A1 | 1/2003 | Pinder |
| 2003/0007516 A1 | 1/2003 | Abramov et al. |
| 2003/0056217 A1 | 3/2003 | Brooks |
| 2003/0083054 A1 | 5/2003 | Francesca et al. |
| 2003/0118014 A1 | 6/2003 | Iyer et al. |
| 2003/0217362 A1 | 11/2003 | Summers et al. |
| 2003/0217365 A1 | 11/2003 | Caputo |
| 2004/0090996 A1 | 5/2004 | Wu et al. |
| 2004/0163129 A1 | 8/2004 | Chapman et al. |
| 2004/0181800 A1 | 9/2004 | Rakib et al. |
| 2004/0205829 A1 | 10/2004 | Hane |
| 2005/0010960 A1 | 1/2005 | Kitazawa et al. |
| 2005/0039212 A1 | 2/2005 | Baran et al. |
| 2005/0055685 A1 | 3/2005 | Maynard et al. |
| 2005/0100076 A1 | 5/2005 | Gazdzinski et al. |
| 2005/0102702 A1 | 5/2005 | Candelore et al. |
| 2005/0108763 A1 | 5/2005 | Baran et al. |
| 2005/0114900 A1 | 5/2005 | Ladd et al. |
| 2005/0122999 A1 | 6/2005 | Scherzer et al. |
| 2005/0198686 A1 | 9/2005 | Krause et al. |
| 2005/0289618 A1 | 12/2005 | Hardin |
| 2006/0015911 A1 * | 1/2006 | Dean ............... H04N 21/235 725/74 |
| 2006/0020983 A1 | 1/2006 | Shau |
| 2006/0020984 A1 | 1/2006 | Ban et al. |
| 2006/0036750 A1 | 2/2006 | Ladd et al. |
| 2006/0047957 A1 | 3/2006 | Helms et al. |
| 2006/0067362 A1 * | 3/2006 | Ramakrishnan ..... H04N 21/235 370/468 |
| 2006/0088063 A1 | 4/2006 | Hartung et al. |
| 2006/0093067 A1 | 5/2006 | Jalali et al. |
| 2006/0130107 A1 * | 6/2006 | Gonder ............ H04L 29/06027 725/110 |
| 2006/0130113 A1 | 6/2006 | Carlucci |
| 2006/0171423 A1 | 8/2006 | Helms |

(56) References Cited

U.S. PATENT DOCUMENTS

| | | |
|---|---|---|
| 2006/0209709 A1 | 9/2006 | Kovacevic |
| 2006/0248553 A1 | 11/2006 | Mikkelson et al. |
| 2006/0248556 A1 | 11/2006 | Yuen et al. |
| 2007/0022459 A1 | 1/2007 | Gaebel |
| 2007/0033531 A1 | 2/2007 | Marsh |
| 2007/0076728 A1 | 4/2007 | Rieger |
| 2007/0094691 A1 | 4/2007 | Gazdzinski |
| 2007/0198839 A1 | 8/2007 | Carle et al. |
| 2007/0217436 A1 | 9/2007 | Markley et al. |
| 2007/0241176 A1 | 10/2007 | Epstein et al. |
| 2007/0250880 A1 | 10/2007 | Hainline |
| 2008/0022012 A1 | 1/2008 | Wang |
| 2008/0066112 A1 | 3/2008 | Bailey et al. |
| 2008/0075163 A1 | 3/2008 | Brydon et al. |
| 2008/0092181 A1 | 4/2008 | Britt |
| 2008/0098212 A1 | 4/2008 | Helms et al. |
| 2008/0134156 A1 | 6/2008 | Osminer et al. |
| 2008/0134165 A1 | 6/2008 | Anderson et al. |
| 2008/0155059 A1 | 6/2008 | Hardin et al. |
| 2008/0192820 A1 | 8/2008 | Brooks et al. |
| 2008/0235746 A1 | 9/2008 | Peters et al. |
| 2009/0249421 A1 | 10/2009 | Liu et al. |
| 2010/0269146 A1 | 10/2010 | Britt |
| 2011/0035772 A1 | 2/2011 | Ramsdell et al. |

\* cited by examiner

T1 = ACTUAL BITRATE ADD UP TO CHANNEL LIMIT. ENCODER MAY MUX DOWN RATES, SO THAT BW IS LEFT FOR OTHER SERVICES

T2 = ACTUAL BITRATE ADD UP TO LESS THAN CHANNEL LIMIT. ENCODER MAY MUX DOWN RATES, OR CARRY STREAMS "AS IS" AND HAVE BANDWIDTH LEFT FOR OTHER SERVICES

T3 = MINIMUM BANDWIDTH REQUIRED BY BOTH STREAMS EXCEEDS CHANNEL CAPACITY.

GENERATION, DISTRIBUTION AND USE OF CONTENT METADATA IN A NETWORK

PRIORITY AND RELATED APPLICATIONS

This application is a divisional of and claims priority to co-owned, U.S. patent application Ser. No. 11/881,009 filed Jul. 24, 2007 of the same title, which will issue as U.S. Pat. No. 8,625,607 on Jan. 7, 2014, and which is incorporated herein by reference in its entirety. The present application is related to U.S. patent application Ser. No. 11/048,334, filed Feb. 1, 2005, and entitled "Apparatus and Methods for Multi-stage Multiplexing in a Network", which issued as U.S. Pat. No. 7,602,820 on Oct. 13, 2009.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the fields of content delivery over a network, and in one exemplary aspect to improving the operation of a content-based network by using bandwidth-related information associated with input content to, inter alia, provide bitrate-based multiplexing of program streams.

2. Description of Related Technology

Video and/or audio programs are often encoded and compressed using hybrid discrete cosine transform (DCT) or differential pulse coded modulation (DPCM) encoding techniques such as those associated with well-known Motion Pictures Experts Group (MPEG), Windows Media 9/10 (WM 9/10), and similar encoding formats. Hybrid DCT/DPCM encoders (and other types of encoders) produce encoded output bits at a rate which varies with time. For example, depending on the motion and texture in the source material, the instantaneous output of an unbuffered MPEG encoder may vary between 1 and 6 MB/s for broadcast quality compression of standard definition video input material.

In many digital video encoding and distribution systems, the variable bit rate (VBR) output of an encoder is buffered and converted to a constant bitrate (CBR) stream. This is achieved by, e.g., reducing the instantaneous bitrate when it exceeds a target rate, and by adding null bits or otherwise "stuffing" the bit stream when the bitrate falls below the target rate. This "conditioning" of the stream is typically performed by or after each encoder, but before multiplexing the program streams into a common stream suitable for conveyance on a service provider's transmission network.

In a conventional digital television network, digital programming thus encoded is usually collected at a central location, assembled in multiple transport streams and transported to other intermediate locations in the network for further downstream transport to consumer premises equipment (CPE). These intermediate locations may alter the aggregated program multiplex received from the central location by replacing or changing the rate associated with programs in the original multiplex. For example, in a coaxial cable network, a cable operator can choose to insert local programming or advertisements at a hub location, and/or modify the aggregated programs received from a headend before the signal is sent downstream to the subscriber premises or other distribution nodes. The replacement programming may be available at the intermediate location in uncompressed (e.g., analog) or pre-compressed (e.g., MPEG-2 transport stream) format. In recent years, more and more central locations (e.g., cable headends) have begun using statistical multiplexing techniques to efficiently create the centrally aggregated program multiplexes.

As is well known, statistical multiplexing (colloquially referred to as "stat-mux") is a technique used to efficiently pack multiple programs within a transport stream. This technique relies on the principle that the instantaneous bandwidth required to transmit a given program fluctuates over time, typically based on the ease of compression of the video content. This makes bandwidth-efficient transmission of multiple programs possible as a multiplex by sharing the total allocated bitrate. Because the bitrate peaks of separate program streams do not occur simultaneously, a group of programs can share an allocated bitrate that is smaller than the sum of the bitrate peaks of the program streams carried. Furthermore, the bitrate contribution each individual program stream is typically controlled (commonly referred to as "rate shaping") to provide both a safety factor or margin, and even greater overall bitrate efficiencies. Conventional approaches to statistical multiplexing have recognized that the greater the number of programs in a multiplex (i.e., "pool size"), the better the chances of using bandwidth efficiently, due in part to a more even statistical distribution of instantaneous bitrates.

While the use of statistical multiplexing is beneficial in many aspects, including for example reduced storage and transport costs, it creates a new set of design challenges that must be adequately addressed. For example, when the program streams sent from the headend to a hub are statistically multiplexed together, insertion of new material at the hub presents additional considerations and challenges for maximization of the multiplex efficiency. When a statistically multiplexed digital program or content is removed from the multiplex, and another digital program is inserted in its place, the instantaneous bandwidth requirements of the two programs are almost never identical. If the instantaneous bandwidth of the original program is less than the instantaneous bandwidth required by the program to be inserted, the program to be inserted has to be quantized to a lower rate, resulting in a loss in quality. However, when the instantaneous bandwidth of the original program is greater than that of the program to be inserted, the quality of a previously encoded replacement program cannot be improved any more than what is already present. Therefore, replacement of a statistically multiplexed program often results in a reduction in quality of the inserted program. In some conventional systems, this quality problem is addressed by providing unused bandwidth in the original multiplex to accommodate for the differences in instantaneous bandwidths.

A variety of approaches to statistical multiplexing and communication between encoding stages are in evidence under the prior art. For example, U.S. Pat. No. 5,708,664 to Budge, et al. issued Jan. 13, 1998 entitled "Statistical multiplexing" discloses a transmitter for transmitting a plurality of digital signals through a plurality of channels, the channels having a predetermined total allocated bitrate. The transmitter includes a plurality of encoders each associated with one channel; a multiplexer for receiving the encoded digital signals and for transmitting the encoded signals as a stream of data, and operable for adjusting the distribution of the bitrate allocation between and among the encoded signals, and a processing device for providing an indication of a target quality and an actual quality for each channel and for causing the multiplexer to repeatedly adjust the distribution of the bitrate allocation in response to differences between the indicated actual quality and the indicated target quality for each channel so as to equalize differences between the actual and target quality across at least some of the channels. By grouping encoders together in "statistical multiplex groups", and making real time decisions about the bitrate requirements for those encoders, bitrate can be allocated to maximize picture quality for the group. For a variety of different picture sources in a statistical multiplex group, to achieve a target picture quality the bitrate requirements of each will vary with coding difficulty. Thus, a channel within the statistical multiplex group that is experiencing little difficulty in encoding its picture can free bits to channels that are having greater difficulty. The effect is to smooth the picture quality and subjectively improve it.

U.S. Pat. No. 6,219,358 to Pinder, et al. issued Apr. 17, 2001 entitled "Adaptive rate control for insertion of data into arbitrary bit rate data streams" discloses an apparatus wherein the rate of insertion of data, such as MPEG table packets, into an outgoing bit stream is varied by a packet handler. The packet handler, which is located in a modulator in a cable television system headend, includes control logic and a packet router. The actual insertion rate of the outgoing data is based on the bit stream's available capacity for insertion of data and the desired insertion rate of the data. When the available capacity for insertion equals or exceeds the desired insertion rate, the actual insertion rate equals the desired insertion rate. When the available capacity for insertion is less than the desired insertion rate, the actual insertion rate is reduced from the desired insertion rate. The invention dynamically determines the available capacity for insertion and adjusts the actual insertion rate.

U.S. Pat. No. 6,285,716 to Knee, et al. issued Sep. 4, 2001 entitled "Video compression" discloses a method to manipulate an MPEG-2 or other compressed video stream as separate information bus and coefficient streams. The information bus stream contains motion vector information but also information derived from a previous decoding operation for use in a subsequent coding operation. Processing in the coefficient domain enables bit rate conversion without decoding to the pixel level and also ostensibly simplifies the combination of MPEG layers.

U.S. Pat. No. 6,577,682 to Brightwell, et al. issued Jun. 10, 2003 entitled "Video processing system also compressing coding decision data" discloses a method in which an MPEG2 decoded video signal is accompanied by a representation of the coding decisions to aid downstream re-encoding. The representation is MPEG compliant bit modified as an attempt to reduce the number of bits.

U.S. Pat. No. 6,792,045 to Matsumura, et al. issued Sep. 14, 2004 entitled "Image signal transcoder capable of bit stream transformation suppressing deterioration of picture quality" discloses how an MPEG2 decoder portion decodes an input bit stream and outputs a digital decoded image while extracting coding information and supplying the same to a control portion. An MPEG2 encoder portion re-encodes the digital decoded image output from the MPEG2 decoder portion. Coding information supplied from the control portion is reflected on a coding parameter in re-encoding. Transcoding between the MPEG2 standard and the DV standard can also be executed by arranging a decoder or an encoder corresponding to the DV standard in place of either the MPEG2 decoder portion or the MPEG2 encoder portion.

U.S. Pat. No. 6,795,506 to Zhang, et al. issued Sep. 21, 2004 entitled "Methods and apparatus for efficient scheduling and multiplexing" discloses techniques and mechanisms for scheduling and multiplexing compressed bitstreams. A compressed bitstream includes bit rate information describing the bit rate of video data. The bit rate information is used to ostensibly improve the scheduling and multiplexing efficiency of compressed bitstreams. Compressed video data can be transmitted over communication channels at bit rates that comply with available channel bandwidth.

United States Patent Publication 20010055336 to Krause, et al. published Dec. 27, 2001 and entitled "Compressed-Video Re-encoder System For Modifying The Compression Ratio Of Digitally Encoded Video Programs" discloses a compressed video decoder/encoder (re-encoder) system for varying the compression ratio of a compressed video program. The composite re-encoder system implements tightly coupled elements for decoding and encoding compressed video data implementing techniques of header forwarding and utilizing an architecture in which a shared motion compensator supports both decoding and encoding operations simultaneously. The re-encoder system may be introduced in a statistical multiplexer for generating a compressed video data stream multiplex suitable for use in cable distribution and other video distribution systems.

United States Patent Publication No. 20020085584 to Itawaki, et al. published Jul. 4, 2002 entitled "Statistical multiplex system, statistical multiplex controller and method of statistical multiplex" discloses a statistical multiplex system, a statistical multiplex controller and a method of statistical multiplex, which can assign bit rates to program data and auxiliary data for purposes of image quality. A statistical multiplex system is provided with: a plurality of image encoders for encoding a plurality of program data; an information encoder for encoding the auxiliary data; a multiplexing apparatus for multiplexing output thereof, and a statistical multiplex controller for controlling each of the image encoders and the information encoder. The statistical multiplex controller is made to set the bit rate to be assigned to the information encoder first, and to assign the remaining bit rates to each of the image encoders.

While the prior art has in general recognized the utility of creating at one video encoding stage information helpful to a next video encoding stage (and communicating such information to the next stage), and the creation of descriptive metadata relating to content, it fails to take into account the fact that at the input to an early (e.g., the first) video compression stage, the highest visual quality content is available. Furthermore, the prior art fails to provide for a suitable method of generating and distributing information related to e.g., the bitrate of the content as a function of time during the content conditioning step described above. Such information could be useful to multiplexers downstream to, inter alia, provide for more efficient and effective program multiplexing and allocation, and improve the visual quality of multiplexed or re-multiplexed video.

Furthermore, the prior art fails to provide a suitable method of multiplexing that avoids computationally intensive techniques to distribute programs in a multiplex, such as by using heuristic parameters such as optimization of visual quality of programs in the multiplex.

Accordingly, it would be most desirable to implement methods and apparatus that generate information regarding bitrates suitable to encode a program, distribute such information within a network and use this information at various locations in the network to provide high visual quality programs to users. Similarly, it is desirable to implement methods and apparatus that provide a multiplexer that uses such information to efficiently create output multiplexes. For the ease of deployment in a content distribution network, such methods and apparatus should also be one that requires minimal changes to existing infrastructure and also is flexible to allow operator to change working parameters to adapt the technique to run-time changes in the network bandwidth utilization.

SUMMARY OF THE INVENTION

The present invention satisfies the foregoing needs by providing inter alia improved apparatus and methods for the generation and use of metadata in various network functions such as multiplexing processes or program allocation functions, as may be used for example in a cable or satellite network.

In a first aspect of the invention, a method of operating a cable television network is disclosed. In one embodiment, the method comprises: receiving bitrate metadata associated with first content at an apparatus of the network; and allocating bandwidth in the cable television network using at least the apparatus, the allocating being based at least in part on the metadata. The first content comprises, for example, deterministic content (i.e., that which is not generated and delivered in real time).

In one variant, the apparatus comprises a multiplexing apparatus, and the method further comprises: encoding the first content to produce an encoded content; and generating the bitrate metadata based at least in part on the act of encoding. The first content comprises variable bitrate content, and the metadata is conveyed to the multiplexing apparatus with the encoded content.

In another variant, the act of allocating comprises performing at least one of: (i) determining which of a plurality of QAMs that the first content will be assigned to; and (ii) determining whether the first content will have its bitrate adjusted.

In a second aspect of the invention, apparatus for use in controlling operations performed by a multiplexer in a content-based network is disclosed. In one embodiment, the apparatus comprises: a computerized device in data communication with a multiplexer; and at least one management process capable of being run on the computerized device. The process is operative to: receive bandwidth metadata associated with a plurality of content; project, based at least in part on the bandwidth metadata, required bandwidth at some period in the future; and perform at least one of program and bandwidth allocation within the network for the plurality of content based at least in part on the projection.

In one variant, the apparatus further comprises a database in data communication with the computerized device, the database comprising bandwidth metadata associated with at least a portion of the plurality of content.

In another variant, the network comprises a cable television network, and the computerized device is disposed at a headend of the network. Alternatively, the network may comprise a broadcast switched architecture (BSA) cable television network, and the computerized device comprises a device disposed at a switching hub of the network.

In another embodiment, the apparatus is for use in controlling the allocation of programs to one or more transports within a content-based network, and comprises: a computerized device; and at least one management process capable of being run on the computerized device, the process being operative to: receive bandwidth metadata associated with a plurality of content; project, based at least in part on the bandwidth metadata, required bandwidth at some period in the future; and perform at least one of program and bandwidth allocation within the network for at least a portion of the plurality of content based at least in part on the projection.

In one variant, the at least one of program and bandwidth allocation comprises determining which of a plurality of programs to add to a given program multiplex.

In a third aspect of the invention, a method of operating a cable network is disclosed. In one embodiment, the method comprises: encoding a program stream to produce encoded content; generating metadata associated with the encoding of the program stream; providing the metadata to a multiplexing and switching controller prior to the time of multiplexing of the encoded content; configuring at least one aspect of the multiplexing based at least in part on the metadata; multiplexing the encoded content with a plurality of other encoded content to produce a multiplexed output; and conveying the multiplexed output to a plurality of subscribers on the network.

In a fourth aspect of the invention, apparatus for providing content to a content based network is disclosed. In one embodiment, the apparatus comprises: encoder apparatus adapted to encode content; generator apparatus in data communication with the encoder apparatus, the generator apparatus adapted to generate data relating to the encoding of the content; and interface apparatus in data communication with generator apparatus, the interface apparatus adapted to receive the data and transmit it to a multiplexing apparatus for use in a multiplexing process.

In one variant, the encoder, generator, interface apparatus, and second interface apparatus are disposed at the headend of a cable television network, and the content source is disposed at another location.

In another variant, the encoder apparatus comprises a variable rate encoder, and the variable rate encoder is selectively controlled using at least data sent back from the multiplexing apparatus.

In a fifth aspect of the invention, storage apparatus comprising a computer-readable medium is disclosed. In one embodiment, the medium contains a plurality of instructions, the instructions comprising a computer program capable of being run on a computerized device, and the program is operative to: receive bandwidth metadata associated with a plurality of content to be distributed within a content-based network; project, based at least in part on the bandwidth metadata, required bandwidth within the network at some period in the future; and perform bandwidth allocation within the network for the plurality of content based at least in part on the projection.

In a sixth aspect of the invention, a method of optimizing the operation of a cable television network is disclosed. In one embodiment, the method comprises: predicting bandwidth demand for at least a first time in the future; determining the actual bandwidth required by at least one program at the at least first time, the at least one program being part of a program multiplex, the multiplex being delivered over at least one of a plurality of QAMs; and adjusting at least one of: (i) the program allocation to the QAMs, and (ii) the bitrate used in transmitting the at least one program, based at least in part on the acts of determining and predicting.

In a seventh aspect of the invention, a method of doing business within a content-based network having both content sources and at least one service provider, is disclosed. In one embodiment, the method comprises: receiving metadata relating to a content element from at least one of the sources, the data specifying minimum quality of service (QoS) requirement for carriage of the content element on the network; carrying the content element on the network in accordance with the requirements based at least in part on the metadata; and exchanging consideration between the at least one source and service provider, the consideration comprising at least the carriage of the content element on the network.

In one variant, the requirements comprise minimum bitrate or bandwidth requirements.

In another variant, the consideration further comprises payment by the at least one service provider to the at least one content source.

In still another variant, the consideration further comprises provision of an audit or log of actual transmission data relating to the QoS requirements by the service provider to the content source.

In an eighth aspect of the invention, a method of operating a content-based network having both a content source and at least one service provider is disclosed. In one embodiment, the method comprises: identifying at least one criterion associated with the delivery of content elements over the network; providing the at least one criterion to the content source; encoding a content element by the source so as to at least substantially comply with the at least one criterion; and providing metadata relating to the encoded content element from the source to the service provider.

In one variant, the method further comprises multiplexing the content element with other content elements based at least in part on the metadata.

In another variant, the identifying comprises identifying at least one criterion which enhances the efficiency of at least one multiplexing process of the network, and the encoding so as to substantially comply comprises adjusting the bitrate of the encoding.

In a ninth aspect of the invention, a content distribution system adapted for the transmission of a plurality of programs over a cable network is disclosed. In one embodiment, the system comprises: a plurality of encoder apparatus; a multiplexing apparatus, the multiplexing apparatus receiving the programs generated by the plurality of encoder apparatus. The encoder apparatus and the multiplexing apparatus communicate through at least one signal path, the communication comprising information used by the multiplexing apparatus in creating an output multiplex based on the programs.

In one variant, the multiplexing apparatus further comprises a switching apparatus configured to switch at least one of the programs to an output port thereof, the output port adapted to carry a program stream for modulation over a single RF channel.

In a tenth aspect of the invention, multiplex apparatus adapted for the transmission of a plurality of content elements over a cable network is disclosed. In one embodiment, the apparatus comprises: first multiplexing apparatus adapted to receive the plurality of content elements from one or more sources, and create at least one output multiplex based thereon; a process in communication with the first multiplexing apparatus and adapted to control at least one aspect of the first apparatus in the creation of the output multiplex; and a data interface adapted to communicate data between the first multiplexing apparatus and a second multiplexing apparatus within the network, the data comprising information which allows bandwidth or rate shaping to be applied by at least one of the first and second multiplexing apparatus.

In an eleventh aspect of the invention, a method of providing a plurality of programs via a cable distribution network is disclosed. In one embodiment, the network has encoder apparatus and a multiplexing apparatus, the multiplexing apparatus receiving the plurality of programs generated by the encoder apparatus, and the method comprises communicating at least one feed-forward signal between the encoder apparatus and the multiplexing apparatus, the signal comprising information used in configuring the operation of the multiplexing apparatus in response to actions taken at the encoder apparatus These and other aspects of the invention shall become apparent when considered in light of the disclosure provided herein.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps, and in which.

DETAILED DESCRIPTION OF THE INVENTION

Figure 1:
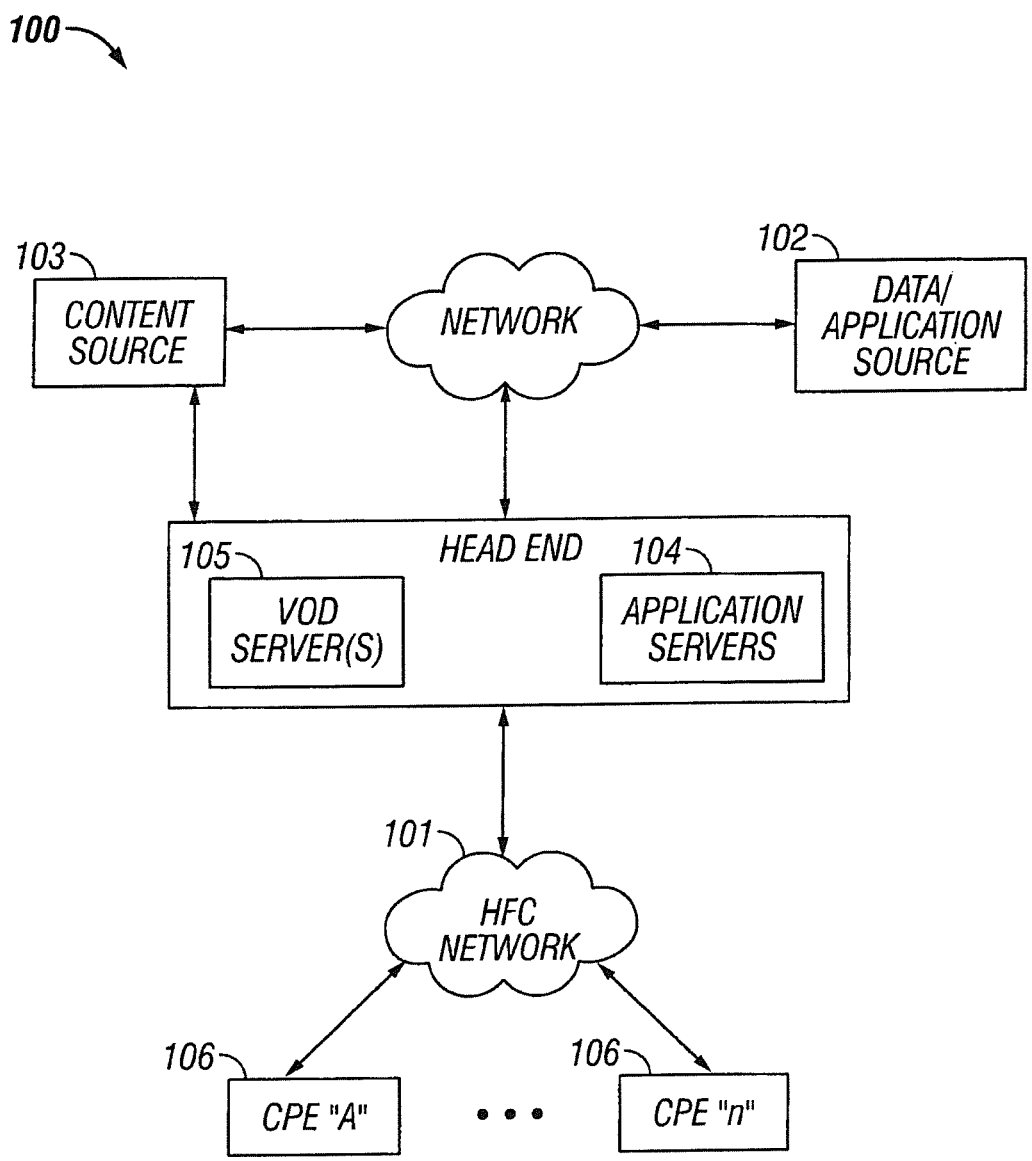
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "capacity" refers to, without limitation, the ability of a network, portion of a network, or component thereof (whether individually or in concert) to provide a requested or needed service, act, or level of performance. One commonly used metric of capacity is so-called "bandwidth", roughly akin to the size of the channel or "pipe" capable of carrying content or other information. However, capacity limitations may be imposed by any number of factors, such as the unavailability of the content from a provider (e.g., studio or television network), delays imposed by transmission, filtering, transcoding, encryption/decryption, conditional access establishment and/or download (e.g., according to a "DCAS" or downloadable conditional access system paradigm), and so forth.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™, or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "conditional access" refers to any access control scheme, whether implemented in hardware, software, or firmware (or combinations thereof), including without limitation members of the "PowerKey™" family, NDS (including VideoGuard, mVideoGuard, etc.), DVB, and Motorola/General Instrument DigiCipher® family (DigiCipher II, etc.). These can be implemented using, for example, CA-specific hardware/software elements embedded in the device, the so-called "CableCARD™" plug-in security module access technology, a downloadable CA system (DCAS), or otherwise.

Similarly, the terms "Consumer Premises Equipment (CPE)" and "host device" refer to any type of electronic equipment located within a consumer's or user's premises and connected to a network. The term "host device" refers generally to a terminal device that has access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation: CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "headend" refers generally to a networked system controlled by an operator (e.g., an MSO or multimedia specific operator) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "network agent" and "network entity" refers to any network entity (whether software, firmware, and/or hardware based) adapted to perform one or more specific purposes. For example, a network agent or entity may comprise a computer program running in a server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers) or the resources shared by them in the form of entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "trickle download" refers to without limitation any delivery or download mode which is at a rate appreciably less than the maximum capability of the extant network over which the downloaded content is being delivered. For example, one type of trickle download might comprise a slow, substantially constant rate download "in the background" using small amounts of excess primary bandwidth capability. Trickle downloads may programmatic (e.g., predetermined to continue in one session until complete, such as based on a bandwidth reservation), or may also be opportunistic; e.g., conducted in two or more segments as excess capacity becomes available.

As used herein, the term "user interface" refers to, without limitation, any visual, graphical, tactile, audible, sensory, or other means of providing information to and/or receiving information from a user or other entity.

As used herein, the term "WiFi" refers to, without limitation, any of the variants of IEEE-Std. 802.11 or related standards including 802.11 a/b/g/n.

As used herein, the term "wireless" means any wireless signal, data, communication, or other interface including without limitation WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for intelligently and efficiently multiplexing and allocating program streams based on inter cilia information provided via ancillary or secondary information (e.g., metadata).

As is well known, a multiple-input-multiple-output (MIMO) multiplexer creates multiple (statistically) multiplexed streams at its output by combining programs from multiple program inputs to it. It is generally desirable to efficiently load or fill up each output of a MIMO multiplexer to its full capacity. For example, in digital cable television (CATV) systems, a MIMO multiplexer is implemented as a group or "bank" of QAM modulators, having multiple digital inputs and multiple modulated QAM radio frequency (RF) signals as outputs.

Each QAM modulator may convert e.g., a 38.8 Mb/s input stream into a 6 MHz wide output RF signal. In the modulator bank, each QAM signal is modulated to a different RF carrier frequency. In the case where each QAM modulator output is 6 MHz wide (U.S.), the various RF bandwidths of the various QAM modulators must be at least 6 MHz wide. In the United States, the RF carriers are typically spaced at 6×N (where N is an integer) MHz apart, with each carrier frequency at the center of a 6 MHz "channel" corresponding to a standard CATV channel plan. Note however that it is not necessarily the case that all RF carrier frequencies of a given QAM modulator bank are on adjacent cable TV channels, i.e., there may be unused cable TV channels between one or more pairs of QAM carriers. To make efficient use of the RF bandwidth of each QAM carrier and maximize quality, it is necessary to fill up its 38.8 Mb/s input stream with as close to 38.8 Mb/s of actual program stream or other data as possible, i.e., to have as little as possible of the 38.8 Mb/s be non-useful data.

To accomplish this, it is necessary to load or pack as many program streams as possible into each QAM modulator input stream. This function is performed by the MIMO multiplexer. This multiplexing function is less complex if all of the program streams are constant-bitrate (CBR). However, if the program streams are all or partly variable bitrate (VBR), then reallocation becomes more complicated since it must be done more or less instantaneously. One prior art way to provide efficient MIMO multiplexing when the input streams are VBR is to use statistical multiplexing technique to pack VBR streams such that the total bandwidth used by a group of streams shows CBR-like behavior. In other cases, so-called "clamping" may be employed to, for example, convert a VBR stream to a CBR stream having a lower maximum bit rate; e.g., by clamping the maximum bit rate to a lower level and stuffing null packets into the resulting clamped VBR stream when the bit rate falls below the clamped rate. For example, a program stream having a VBR of 2-8 Mb/s from a satellite feed may be clamped to a maximum of 6 Mb/s. These techniques may succeed in reducing or eliminating the possibility that a multiplexer's instantaneous input bit rate may exceed its output capacity, but possibly at the expense of video quality or other such parameters. In the foregoing example, if 8 Mb/s is desirable for optimal quality, but the bit rate is clamped to a maximum of 6 Mb/s, then some degradation in quality may be experienced so as to insure that the input bit rate of the multiplexer that carries that program stream never exceeds the output capacity of that particular multiplexer.

The exemplary embodiments of the present invention advantageously reduce the necessary hardware and software resources needed to efficiently multiplex or switch incoming program streams via the use of capacity (e.g., bandwidth) related metadata which includes, for example, required transmission bitrate as a function of time for VBR program streams. Use of this bandwidth metadata (BWM) may reduce processing resource requirements and/or improve quality in various embodiments. Deterministic bitrate metadata is used to provide more efficient and effective multiplexing of programs, whether in broadcast (e.g., broadcast switched architecture) or session-based (e.g., VOD) applications.

Exemplary system environments in which it may be useful to multiplex VBR streams include for example those described in co-owned U.S. patent application Ser. No. 11/243,720, filed Oct. 4, 2005 and entitled "Self-monitoring and Optimizing Network Apparatus and Methods", issued as U.S. Pat. No. 8,582,584 on Nov. 12, 2013, co-owned U.S. patent application Ser. No. 11/048,334, filed Feb. 1, 2005 and entitled "Apparatus and Methods for Multi-stage Multiplexing in a Network", issued as U.S. Pat. No. 7,602,820 on Oct. 13, 2009, and co-owned U.S. patent application Ser. No. 09/956,688, filed Sep. 20, 2001 and entitled "Technique for Effectively Providing Program Material in a Cable Television System", published as U.S. Patent Application Publication No. 2003/0056217 and issued as U.S. Pat. No. 8,713,623 on Apr. 29, 2014, each of which are incorporated by reference herein in their entirety, although it will be appreciated that other systems and applications may make use of the methods and apparatus described herein.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture of a multiple systems operator (MSO), digital networking capability, and plurality of client devices/CPE, the general principles and advantages of the invention may be extended to other types of networks and architectures where bandwidth conservation is required or desirable (whether broadband, narrowband, wired or wireless, content or data, or otherwise). Hence, the following description is merely exemplary in nature. For example, the invention may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are also possible.

It is also noted that while portions of the following discussion are cast primarily in terms of two service levels (i.e., SD and HD), the methods and apparatus disclosed herein can be extended to other numbers and types of service levels. For example, it is foreseeable that yet even higher levels of definition may be employed in the future (e.g., "ultra-high definition" or UHD), thereby allowing intelligent bandwidth conservation between three service levels (SD, HD, and UHD). As another option, multiple levels or rates may be present with one of the aforementioned service levels, such as where the SD level includes levels SD1, SD2, . . . SDn, and/or the HD level similarly includes HD1, HD2, . . . HDn, with each of these sub-levels having different data rates and/or other characteristics. Alternatively, bandwidth conservation according to the present invention may be performed not based on definition level (data rate), but some other attribute such as for example the selective availability of a type of service (e.g., OD, IPTV, or DVR/PVR). Various alternate conservation schemes are described subsequently herein in greater detail.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems. Additionally, the invention is in no way limited to any particular modulation type or medium access scheme, and can be implemented using for example using QAM, orthogonal frequency division multiplexing (OFDM), sigma-delta modulation (SDM), time-division multiplexing (TDM), etc.

Bearer Network Architecture

FIG. 1 illustrates a typical content-based network configuration with which the enhanced metadata-based multiplexing apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simplified architecture comprising one of each of the aforementioned components 102, 104, 105, 106 is shown in FIG. 1 for ease of illustration, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to an application distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 can be a computer system where such applications can enter the network system. Distribution servers are well known in the networking arts, and accordingly not described further herein.

The VOD server 105 comprises a computer system where on-demand (OD) content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the application distribution server 104) that can be accessed by a distribution server 104.

Figure 1A:
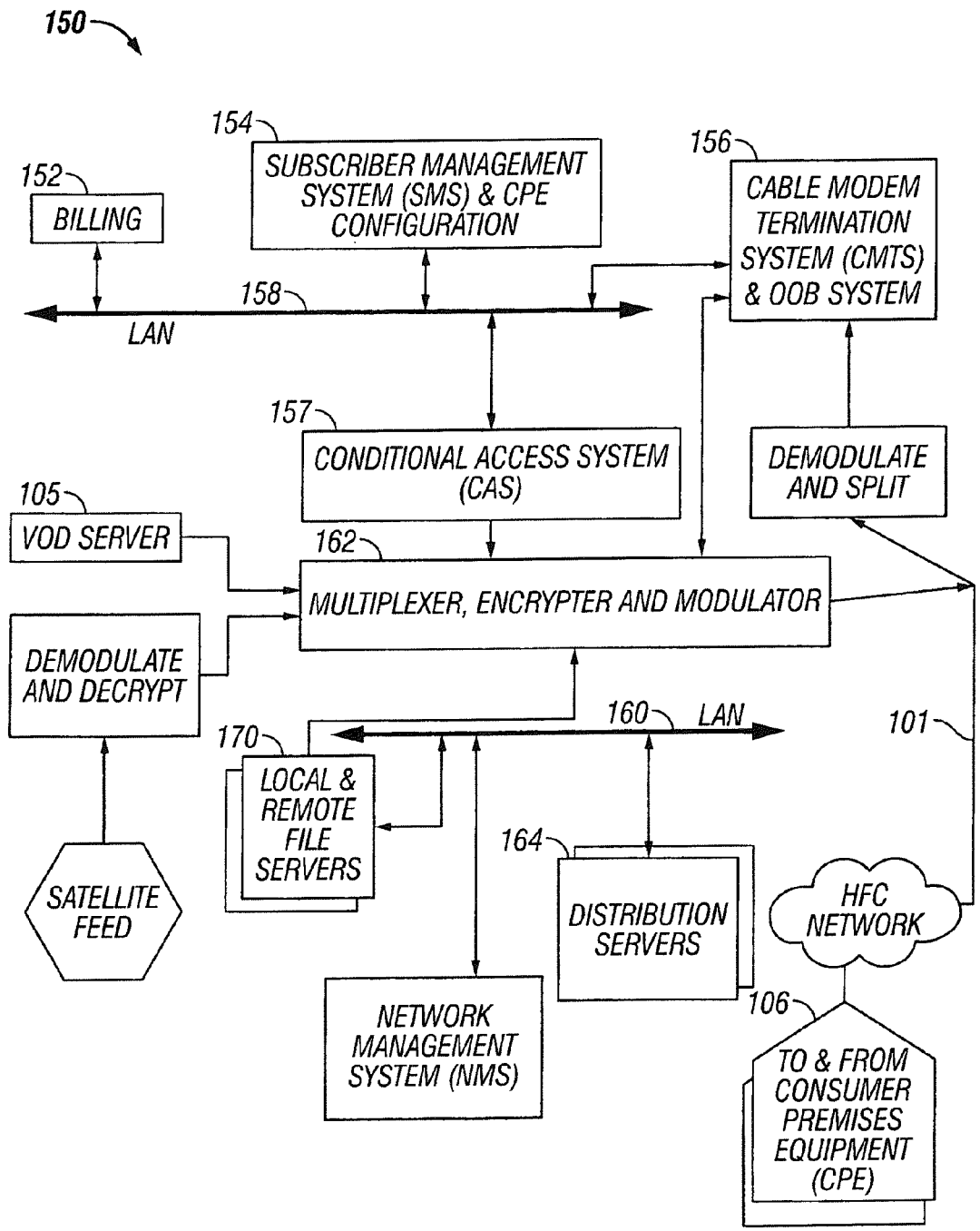
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
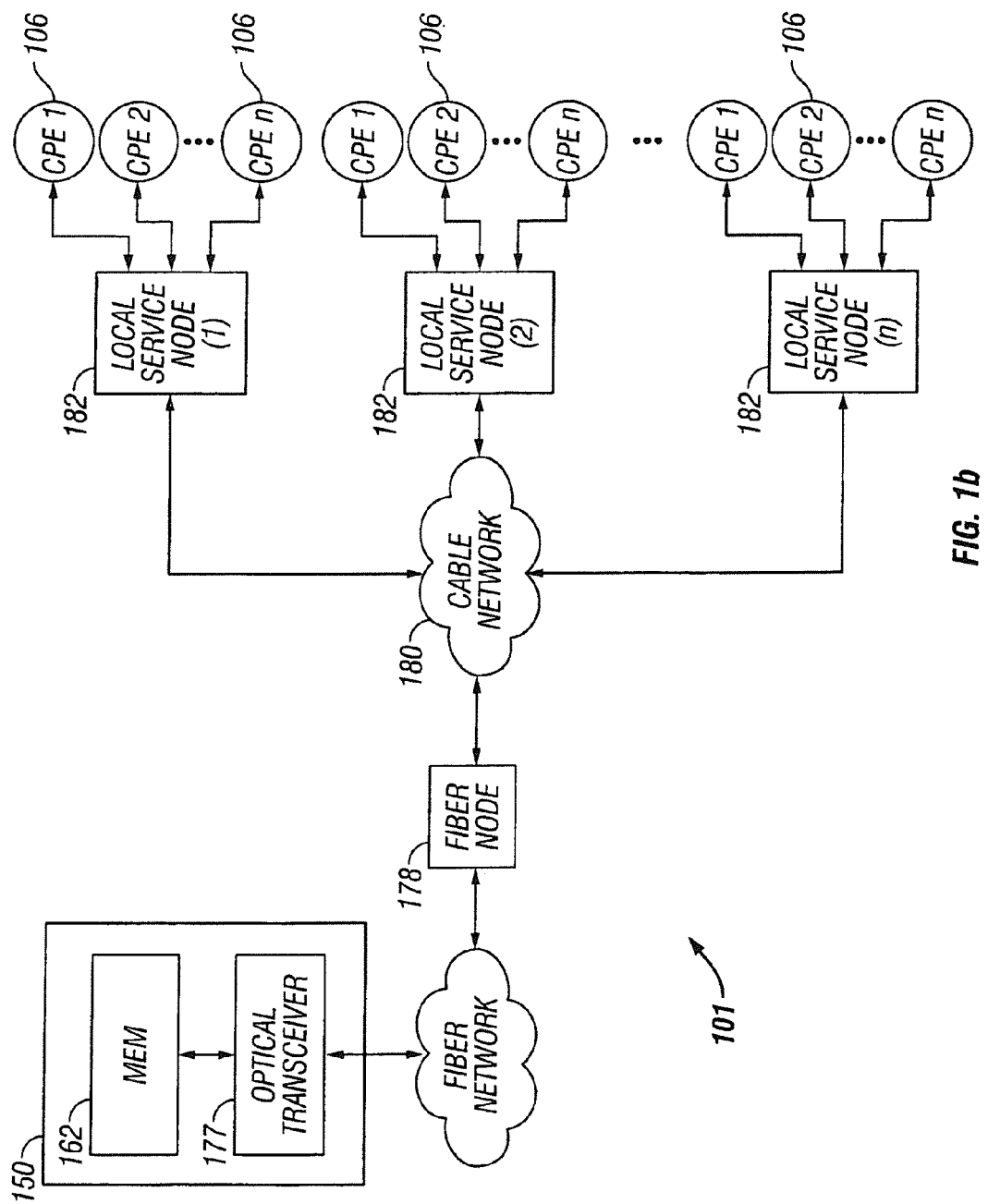
FIG. 1b is a functional block diagram illustrating one exemplary local service node configuration useful with the present invention.

The architecture 150 of FIG. 1a further includes a multiplexer/encrypter/modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

Figure 1C:
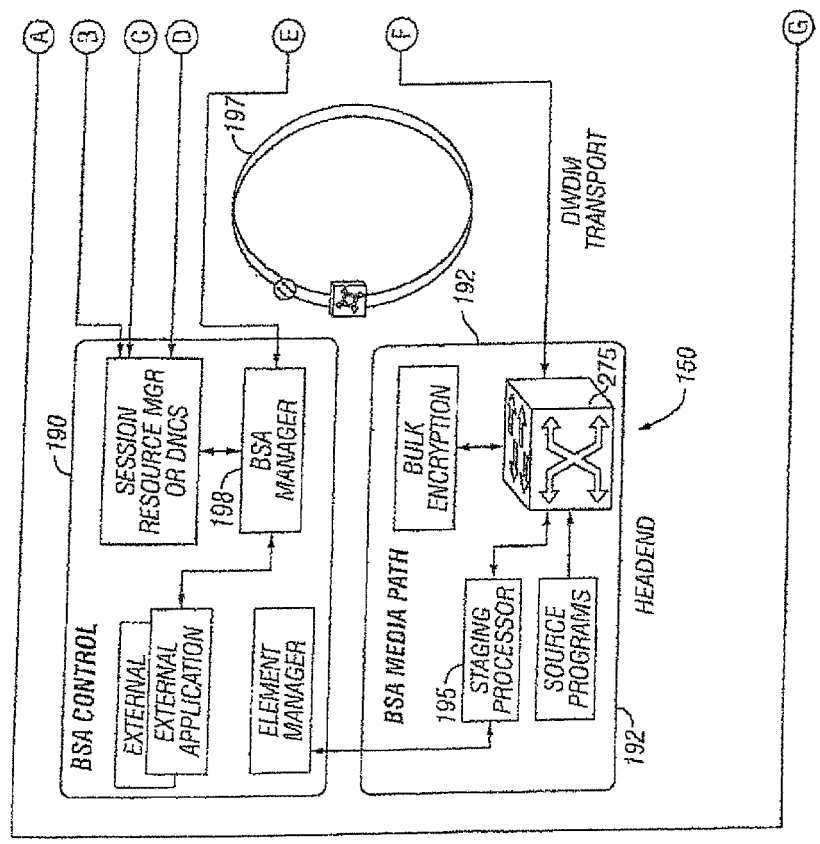
FIG. 1c is a functional block diagram illustrating one exemplary broadcast switched architecture (BSA) network useful with the present invention.
Figure 1C:
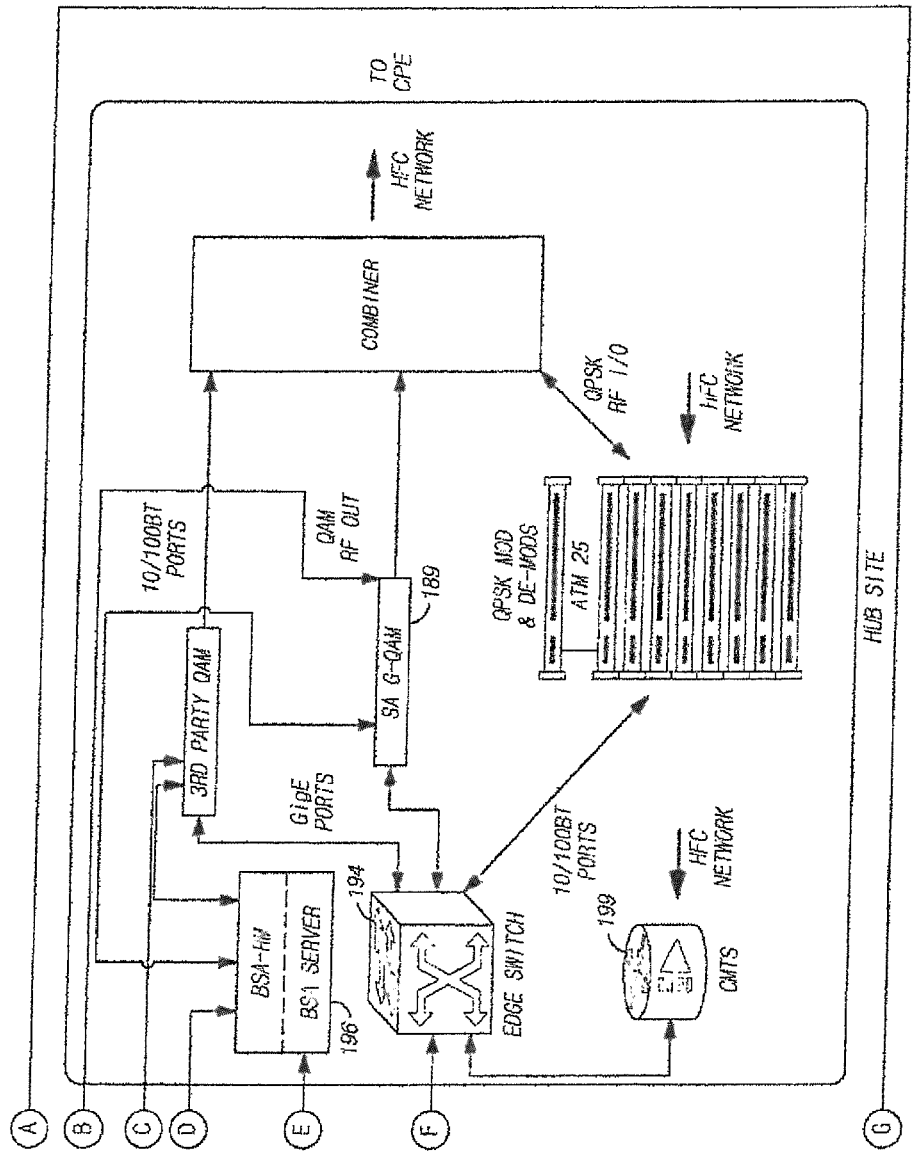

It will also be recognized, however, that the multiplexing operation(s) of the present invention need not necessarily occur at the head-end 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. patent application Ser. No. 11/048,334, entitled "Apparatus and Methods for Multi-stage Multiplexing in a Network" previously incorporated herein, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks

FIG. 1c illustrates exemplary "switched" network architecture also useful with the enhanced multiplexing apparatus and features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these elements cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "TECHNIQUE FOR EFFECTIVELY PROVIDING PROGRAM MATERIAL IN A CABLE TELEVISION SYSTEM" which is published as U.S. Patent Application Publication No. 2003/0056217, and issued as U.S. Pat. No. 8,713,623 on Apr. 29, 2014, and which is incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RE channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Exemplary Methods

Figure 2:
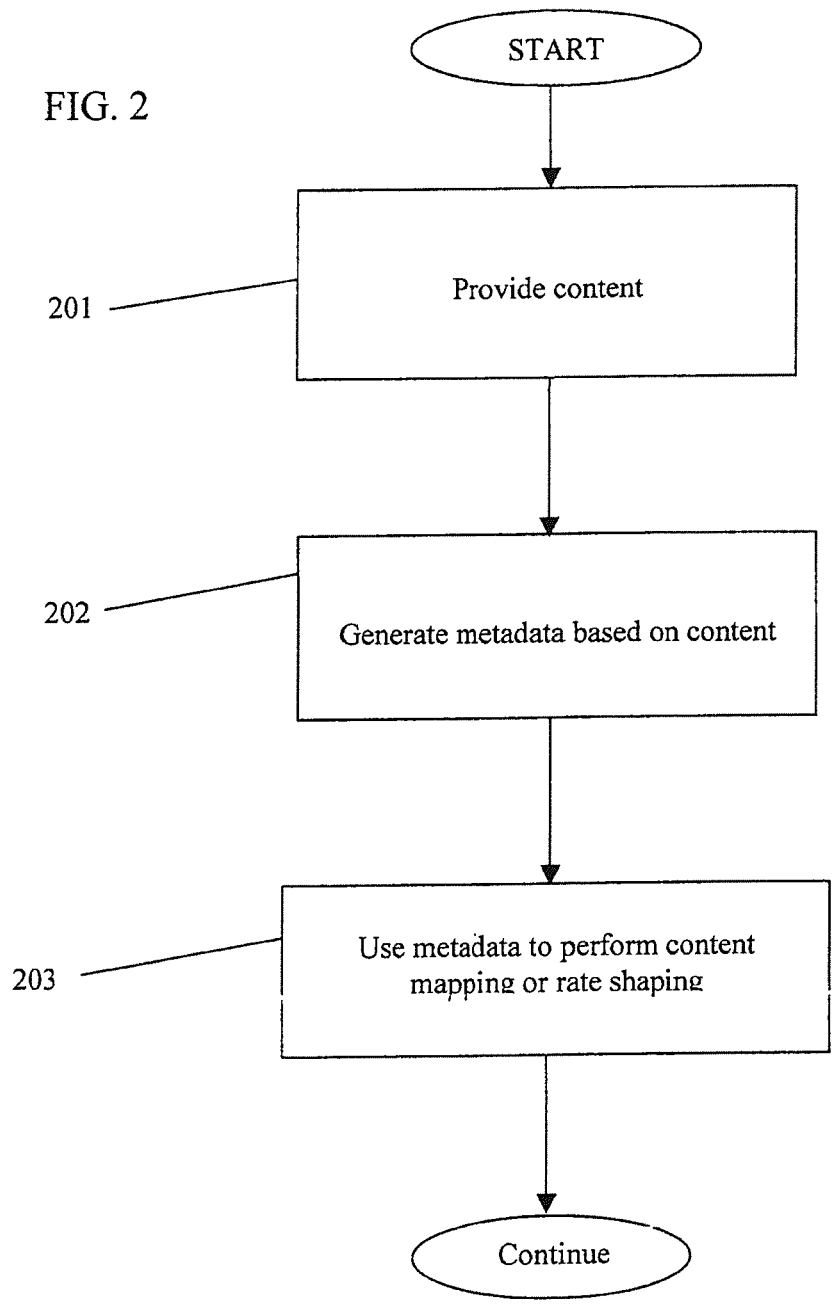
FIG. 2 is a logical flow diagram illustrating one embodiment of the generalized methodology for generating and utilizing capacity-related information (e.g., metadata) within a content-based network
Figure 2A:
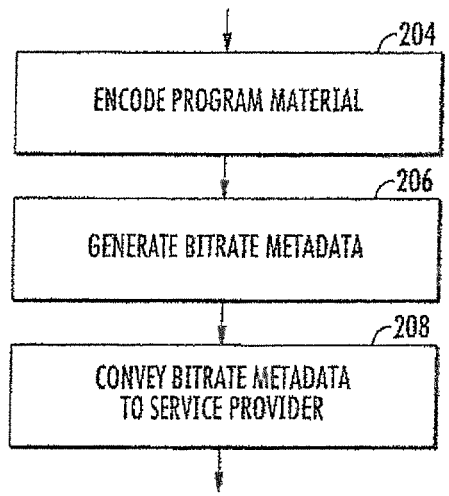
FIG. 2a is a logical flow diagram illustrating steps of exemplary bandwidth metadata generation implemented by a content provider in accordance with the present invention.
Figure 2B:
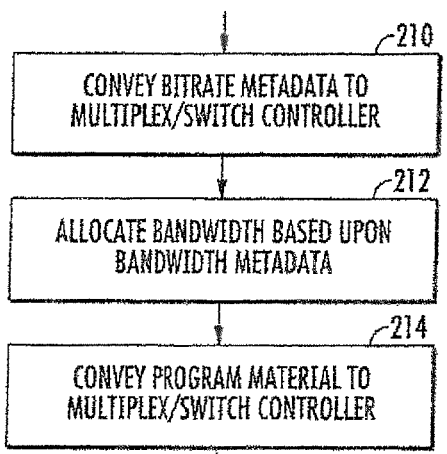
FIG. 2b is a logical flow diagram illustrating steps of exemplary bandwidth metadata generation and use by a service provider in accordance with the present invention.

Referring now to FIGS. 2-2b, exemplary embodiments of the methodology for generating and utilizing capacity-related information (e.g., bitrate metadata) within a content-based network are described.

As shown in FIG. 2, the generalized methodology includes first providing content (step 201). Such content may include for example a program stream, gaming content, a data file, an application or yet other types of data; however, for the purposes of illustration, the content will be considered to comprise a programming stream (e.g., television broadcast or movie).

Next, per step 202, information (e.g., metadata) is generated for the content provided in step 201. As used herein, the term "metadata" refers generally and without limitation to secondary or ancillary data that is not per se part of the content itself (although as described below it may be transmitted along with or as part of the content in an embedded fashion). The metadata information may be packaged in a prescribed format such as XML, and associated with the primary content to be delivered. The exemplary metadata may also comprise human-recognizable data, words and/or phrases that are descriptive of or related to the content of the clip in one or more aspects ("contextually related") to the primary content. In one embodiment, the metadata is optionally made human-readable to facilitate easier searching; this facilitates searching of the metadata using e.g., a search engine such as that described in co-pending and co-owned U.S. patent application Ser. No. 11/198,620 filed Aug. 4, 2005 and entitled "METHOD AND APPARATUS FOR CONTEXT-SPECIFIC CONTENT DELIVERY", which is published as U.S. Patent Application Publication No. 2007/0033531 and issued as U.S. Pat. No. 8,713,623 on Apr. 29, 2014, thereby making the metadata multi-functional (i.e., useful for titrate data as well as ascertaining the subject matter, etc., of the content). However, this is not a requirement. For example, in some cases, it may be desirable to encrypt or hash the metadata so as to prevent unauthorized access. Alternatively, unencrypted but non-human readable data can be used, such as where the metadata is encoded in hexadecimal or binary, or any other number of different coding schemes. A "universal" format or protocol can be adopted and used so as to standardize metadata formats for content from differing sources and used by differing service providers, thereby obviating transcoding or reformatting of the metadata itself.

In another embodiment, a metadata file resides at another location (e.g., URL) associated with the requested primary content element as opposed to being transmitted directly therewith. The naming convention of this file is optionally standardized so that it is easily locatable. All of the metadata files may be rendered in the same format type (e.g., XML) for consistency, although heterogeneous file types may be used if desired. If metadata files are encrypted, then encryption algorithm information of the type well known in the art is included. The foregoing information may be in the form of self-contained data that is directly accessible from the file, or alternatively links or pointers to other sources where this information may be obtained.

The metadata described herein may also be made part of a database or repository that can be searched or accessed by multiple entities simultaneously. This is particularly useful to network operators looking to "design" multiplexes using inter alia bitrate metadata as an input to the design process (see discussion provided subsequently herein).

Note that per step 202, the bitrate or other metadata need not be generated while encoding. In one variant, the content is already encoded, and the metadata is generated by analyzing or processing the file after encoding. In another embodiment, the bitrate metadata is generated during the encoding process. In another embodiment, the bitrate metadata is generated during encoding, and the other metadata (if any) is appended thereto subsequently. In still another embodiment, non-bitrate metadata (if any) is generated first and inserted into a data structure (e.g., XML file), and the bitrate data loaded into the file subsequently such as during encoding. Many other variations will be recognized by those of ordinary skill given the present disclosure.

Per step 203, the completed metadata is then provided to the service provider, where it is used to aid in the multiplexing, program allocation and/or rate-shaping decisions performed in the service provider distribution network.

FIG. 2A shows exemplary process flow for generating capacity metadata (e.g., bandwidth metadata, or BWM) information useful for efficiently multiplexing programs in a multimedia distribution network. These steps will typically be implemented in functional blocks under the control of a content provider (e.g., third party source, web server, studio, etc.). In some cases, a service provider may also perform all or a portion of these functions at a headend facility used to aggregate content and send it over the service provider's network. However, it should be noted that the functional blocks for generating the BWM can literally be disposed or performed at any point (or at two or more points) upstream of the multiplexer(s) within the multimedia distribution network.

In step 204, program material (such as e.g., one or more individual programs) is encoded or compressed for transmission over a content distribution network. Content is typically encoded or compressed to reduce its required transmission bandwidth. For example, a standard definition (SD) television program at the input of the encoder metadata generator (EMG) described subsequently herein may require 6 MHz of bandwidth if transmitted as an analog television signal, or may require a 270 Megabit/second bitrate, if transmitted in an uncompressed digital format. In today's digital television distribution networks, an encoder typically converts this program to a 1-6 Megabits/second MPEG2 bitstream that requires much less transmission bandwidth.

At step 206 BWM is generated. The BWM is, in one embodiment, generated by a Metadata Compiler (MC) function which will be described in greater detail below. The Metadata Compiler is useful for, inter alia, calculating the instantaneous bitrate of the encoding process by, for example, counting bits generated per a unit time. This unit time or time window over which bits are counted may vary according to the desired granularity of the multiplexing or switching process, as will be described in more detail below. The process of encoding the program material will also optionally include, in some embodiments, storage of the program material on or in any suitable storage medium such as a hard disk drive, RAM or buffer memory, cache, optical disc, etc. Encoding of the metadata may also optionally comprise retrieval of the program from one storage medium and recording of the program to another storage medium, such as by retrieving a program from a hard drive and recording it onto an optical disc, etc. This process may also include transient or temporary storage as required.

The exemplary BWM output of the Metadata Complier may be carried with or within the encoded content (e.g., "in-band"), may be carried out-of-band as a separate data stream or file, or delivered via any number of other different communication channels or mechanisms (or combinations of the foregoing). In one embodiment, the BWM is organized by dividing the encoded content into multiple time segments, and associating metadata with each time segment, or groups of time segments. For example, the description may be organized as a bitrate "mask" that gives the value of the maximum bitrate required associated with each time segment, and a time code (e.g., SI data or other such frame of reference) identifying the segments. In various embodiments, the time code may identify the time segment based on segment start and/or end time coordinates, duration, elapsed time since the beginning of the program, reference to another associated event (e.g., advertising insert), and so on. The duration of each time segment may be constant or variable, and may be selected based on network operator selection, time variance of bit rate or other deployment considerations such as bandwidth, or file size available to carry the metadata.

The BWM may additionally include information that identifies the encoded program by its name and other information, if any, as well as other types of ancillary information that may be useful to the multiplexer or other network processes. For example, the metadata may also include information identifying the date that the material was created (and/or the date that it was encoded) and any other information useful to uniquely identify the program. This may include using descriptive words or codes such as SPORTING EVENT, MOVIE, NEWSCAST; CONTENT PROGRAMMER (e.g., ABC, NBC), and so forth. The metadata may also include information identifying the encoding facility. For example, the source or provider of the BWM may include identifying information (e.g., a name or code for a network studio or station or the like). Alternatively, portions of the BWM can be added by multiple entities, and/or editing or updating of another entity's BWM performed. Various permutations and mechanisms for generating, adding and editing BWM will be recognized by those of ordinary skill, and hence are not described in greater detail herein.

The metadata may also include a content index versus time; this may be used identify different parts of the content that may be treated differently during the distribution (e.g., multiplexing) process. For example, if the content comprises sports programming which includes commentary, replays, and clips from previous games, in addition to on-the-field action sequences, the commentary, replays, and clips may be encoded at lower bit rates than the on-the-field action sequences; this may provide, e.g., opportunities for reallocating transmission resources or carrying additional data at various nodes within the transmission system by categorizing the content and encoding, or modifying the content according to one or more pre-specified rules.

The metadata may further optionally include DRM (digital rights management), cryptographic, or other security or copy-prevention data such as watermark information, etc., associated with the content, so as make this information readily available to one or more downstream processes.

See, e.g., co-owned U.S. patent application Ser. No. 11/811,953 filed Aug. 4, 2005 and entitled "METHODS AND APPARATUS FOR PROVIDING VIRTUAL CONTENT OVER A NETWORK", published as U.S. Patent Application Publication No. 2008/0092181, and issued as U.S. Pat. No. 8,024,762 on Sep. 20, 2011 and co-owned U.S. Provisional Patent Application Ser. No. 60/813,479 filed Jun. 13, 2006 entitled "METHODS AND APPARATUS FOR PROVIDING VIRTUAL CONTENT OVER A NETWORK", each of the foregoing is incorporated herein by reference in its entirety, which describes exemplary schemes for metadata use for inter alia the description or characterization of content.

In some implementations, BWM may only be generated for a certain portion of a program. For example, the first 1.5 hours of a 2 hour program, or the first few minutes and the last few minutes of a movie only may be characterized, and so on. Generating metadata for only certain portions of a program may be useful for, inter alia, managing areas of time where bandwidth etc. are in significant flux, thereby providing BWM only at times of need. This may be beneficial in cases where it is not efficient to generate BWM for entire transmitted content, to reduce processing overhead (or metadata file size, etc.). This approach is somewhat akin to generating data for differences or changes only as may be used with html websites or the like, as opposed to continuously generating data for the whole of a data element or collection, whether it is changing or not, and hence provides inherent efficiencies.

Note that the selected portion or portions may also be varied dynamically or according to another scheme, such as a process or algorithm which runs or looks ahead of the MC (whether in real time, or offline) and which evaluates the content for the need to generate BWM. For example, in one variant, the aforementioned look-ahead process comprises a computer program adapted to identify segments or portions of the content which vary more than a certain amount or percentage from a prescribed metric; e.g., a moving average of the instantaneous bandwidth or the like. Alternatively, the look-ahead process can characterize all or portions of the content as to the desired parameters (e.g., develop an instantaneous bandwidth profile as a function of time or SI coordinate), which can then be analyzed for artifacts or features of interest. One such case might be to integrate the area under the bandwidth curve to evaluate bandwidth consumption for a given segment or portion of the content, and only when that area exceeds a certain value (e.g., on a per increment basis), indicating that a sustained change in instantaneous bandwidth is being experienced, will the BWM for that segment be generated. Myriad other approaches to identifying artifacts of interest (e.g., changes in bandwidth, certain shapes or trends, etc.) may also be used with the aim of selectively identifying one or more portions within the content where the generation of BWM will be useful, while also avoiding unnecessary BWM generation in cases where the BWM will be of little or no value to the multiplexing or allocation (or other) processes.

The portion of the program for which metadata is generated may also optionally be assumed to be sufficient or used as a basis to properly allocate distribution resources for the entire program. Further, BWM comprising only peak bit rate (or a histogram or other such data structure indicating frequency of occurrence of a range of peak bandwidths) for the program may be provided in some embodiments. In other embodiments, metadata may contain information about minimum acceptable bitrate on a per-segment basis.

In other implementations, BWM may be generated in its entirety at the Metadata Compiler, and only certain portions of the BWM will actually be transmitted downstream to the multiplexer(s). For instance, a processing apparatus may take the output of the Metadata Compiler and analyze it for predetermined threshold values or artifacts of interest. These for instance may include periods of time where the bandwidth requirements of the program exceed a predetermined threshold, and/or periods of time where the bandwidth requirements remain below a predetermined threshold level. Therefore, BWM may only be transmitted where that BWM includes information about when content exceeds and/or remains below certain threshold levels. Hence, BWM that is not necessarily computationally useful may be simply discarded so as to minimize the overhead/bandwidth or infrastructure requirements associated with transmitting the BWM to the multiplexer(s). A wide variety of algorithms readily appreciated by those of ordinary skill in the art provided the present disclosure may be implemented upstream of the multiplexer(s) in order to limit or select the transmitted BWM to computationally useful portions of the generated BWM.

The metadata may also optionally include the playing time of the program. The playing time may be used by downstream network elements to add/drop the program from a multiplex or carry the program to a group of CPEs or limit the viewing right to the program (e.g., in store-and-watch applications). The step of generation of the metadata may also include storage of the metadata on any suitable storage medium, such as a hard drive or an optical disc. The step may also include retrieval of the metadata from one storage medium and recording of the metadata onto another storage medium, such as, for example, retrieving the metadata from a hard drive and recording it onto an optical disc. In general, this step may include recording metadata on the same physical medium as the associated program material or on a different medium.

In step 208, the BWM file or stream and the program material are conveyed to a service provider as needed. The service provider may be, for example, a cable TV system operator, a fiber optic transmission system operator such as a regional telephone company, or a satellite broadcaster, to list only a few possibilities. The conveyance may be by delivering physical media such as a disc or tape, or by electronic transmission using any suitable transmission system, such as a network (e.g., the Internet, LAN, WAN, etc.). This step may also include storing the metadata and the program material on any suitable storage medium, such as a hard drive or an optical disc under control of either the service provider or the content provider and program material and metadata may be stored on different storage media. The BWM may, as previously described, be delivered downstream within the service provider network via e.g., an in-band program delivery mechanism (e.g., fiber channel, RF QAM, DOCSIS downstream channel, etc.)

For example, in embodiments where the BWM is generated at the facilities of the service provider, conveyance to the service provider may comprise any form of physical or electronic transfer of the metadata from its generation point within the service provider's facilities, through any intermediate point(s) within the service provider's facilities, including e.g. a third party's facilities, to the ultimate point of use. In one such embodiment, the metadata may in principle be generated at one physical location owned by the service provider, transported across a network owned by a third party, and thereby electronically delivered to a second physical location owned by the service provider.

It will also be appreciated that the metadata (whether BWM or otherwise) associated with different programs or content can be aggregated into one or more data structures. For example, the bandwidth metadata for multiple programs can be assembled into a common file or stream, and then "unpacked" at the downstream multiplexer or other processing entity, such as based on the aforementioned program ID or other information uniquely associating the individual BWM with a given program. The aggregation may be conducted according to any number of different logical schemes including e.g.; (i) randomly (i.e., random program streams or channels); (ii) based on assignment to one or more common QAMs; or (iii) based on one or more common parameters (e.g., common start and/or end time, duration, encoding type, content source, etc.).

Referring now to FIG. 2B, an exemplary process flow of how the BWM may be used within a service provider's network is shown and described in detail. In step 210 of FIG. 2B, the metadata file or stream is conveyed to a Downstream Program Multiplex Generator (DPMG). This may occur using any number of different transport modalities including in-band or OOB channels, a separate network (e.g., LAN or WAN) interface, and so forth. As described in greater detail below, the delivery of this information ideally precedes the program multiplexing process in time in order to provide the DPMG with "look-ahead" capability.

In step 212, the BWM is used by the DPMG in allocating bandwidth to the corresponding program(s), and optionally allocating programs to various multiplexes or QAMs. The BWM may be used as the sole basis of this allocation process, or alternatively one of two or more inputs to the process. Other inputs might comprise, for example, supervisory operational or business "rules", other network operational parameters relating to capacity and/or demand, and so forth. For example, one variant of the invention uses BWM for several or all the programs to be combined into a multiplex. Knowledge of other programs (and their BWM) that are already flowing to that service group help the DPMG better allocate resources. Moreover, the DPMG may have multiple multiplexes to choose from in terms of allocating a given program; use of the BWM for the program being allocated (as well as other programs included or ostensibly to be included in a given multiplex) helps assure the most efficient allocation by the DPMG.

It will also be appreciated that the BWM for a program can be used as the basis for adjustments to other programs in or to be included in a given multiplex. For example, if program A has a given bitrate profile, the bitrates associated with programs B, C and/or D in that same multiplex might be clamped at a prescribed maximum value during a given period of time in order to accommodate higher bitrates in program A for that same time period.

The foregoing metadata information describing various portions of the various programs (e.g., on-field play of a sports event versus commentary, etc.) can also be used to facilitate, adjust settings of, or inhibit such clamps within certain programs as well. For example, if during a period of very high bitrate in program A, program B has an on-field play sequence (i.e., where high resolution/quality is needed), then program B would be inhibited from significant rate clamps or have rate clamps activated at higher bitrate points, and instead program C or D (which did not have any such restrictions) would be clamped instead at more restrictive rates.

Other factors may be considered and/or used as inputs to the multiplexing and allocation processes of the present invention. For example, an MSO may want to keep a given viewer in a given multiplex over a period of time (such as to support other network economies or efficiencies, or operational/business goals). Hence, in one variant, the DPMG process may use such information in its decision where to add a requested program stream (i.e., where the program is added depends at least in part on which particular subscriber requests it).

Finally, in step 214, program material is conveyed to a Multiplex/Switch Controller (MSM) to further utilize the BWM to efficiently construct one or more multi-channel program multiplexes for delivery to the CPE.

In addition to the multiplexing/switching functions, the Multiplex Mapping Controller (MMC) 342 (see FIG. 3B) may process the aforementioned metadata to extract the program identification (PID) information. The MMC may use this information to inter alia queue the program material for playback by the service provider during an appropriate timeslot, e.g., according to a pre-determined program broadcast schedule.

The bitrate versus time information of the metadata may be used to by the MMC (per step 212) to predictively configure a multiplex and, in some embodiments, a switching process, to accommodate the program stream. For example, bitrate versus time metadata may be used to efficiently allocate the capacity of one or more QAM carriers in a multiplex by determining how to best allocate streams across the various carriers such that the total bitrate capacity of each carrier is not exceeded for some given period of time. For example, a set of streams may be allocated to each carrier in a relatively static fashion which may be, e.g., as long as days, weeks, months, or even longer, depending on the mix of program channels that are available to a service provider at a given time.

In some embodiments, the MMC 342 analyzes the BWM to extract the peak bitrate of the programs. Foreknowledge of the peak bitrates of programs may be used by the MMC to ensure that the combined bitrate of a set of to-be-multiplexed programs will not exceed the output capacity of the multiplexer(s) that will multiplex those programs (and hence potentially result in program quality degradation). For example, if 10 programs are to be multiplexed, the peak bit rates of those programs may be evaluated to ensure that the sum of the peak bit rates can be accommodated by the multiplexer(s) tentatively allocated to carry those programs. In one embodiment, this evaluation can be conducted largely irrespective of when the peak bitrates occur relative to one another, since if the sum of the absolute peaks of the respective programs are enveloped by the system bandwidth capability, then all instances and combinations thereof will be accommodated.

However, the foregoing approach may also result in significant "wasting" of bandwidth, since the remainder of (i.e., off-peak) portions of each program will by definition use less bandwidth, and hence the sum of the peaks comprises a worst-case scenario which may or may not even occur. Hence, in another approach, it may be determined that although those 10 programs of the foregoing example may be carried by one QAM carrier most of the time, at some times when the peak bit rates of several programs align (i.e., are simultaneous or nearly simultaneous in time), it may be necessary to allocate one or more programs to a second QAM carrier. By evaluating when the peaks of the program occur, the bandwidth required or allocated to support the multiplexed streams can be reduced (or more streams allocated to the same multiplex), since the need for the "sum of the peaks" bandwidth may never arise (or if it does, it can be managed using other approaches).

Alternatively or in conjunction with the foregoing, program streams may be reallocated to different carriers (QAMs) at convenient times. For example, a "program channel" stream (such as, e.g., ABC TV) may carry various programs, and that program channel stream may be reallocated to another QAM carrier at, for example, the end of one program within that stream, or coincident with a given time reference (e.g., midnight local time).

As another example, bitrate-versus-time information for the program may be used to re-allocate a program stream to carry the program at some point after the start of transmission of that program. For example, the bitrate versus time information may indicate that the first hour of a given program may require a maximum bit rate of only 3 Mb/s, whereas at one (1) hour into the program and at one or more times thereafter, the required bitrate may exceed 3 Mb/s. Assuming that the multiplexing process cannot provide more than 3 Mb/s using the QAM to which the program is initially assigned, the multiplexing process may predictively schedule the reallocation of the program to a different QAM with more capacity shortly before the running time of the program reaches one hour.

In another example, if the bit rate versus time metadata indicates that the maximum required bit rate for the program will drop from 6 Mb/s to 3 Mb/s part way (e.g., half way) into the program, and remain below 3 Mb/s until the end of the half-hour long program, then after 15 minutes into the program the controller process may schedule the re-allocation of 3 Mb/s on the relevant QAM carrier for carrying another program stream.

Exemplary Functional Entities

Figure 3A:
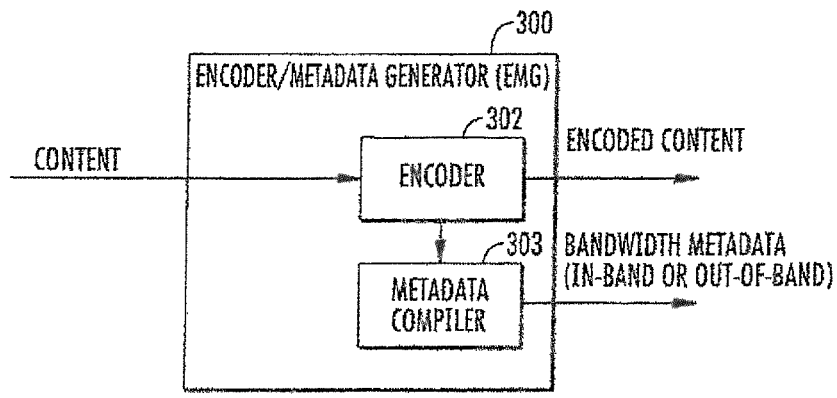
FIG. 3a is a functional block diagram of an encoder/metadata compiler in accordance with the present invention.

Referring now to FIG. 3A, an exemplary block diagram of an Encoder Metadata Generator (EMG) 300 according to the present invention is shown and described in detail. The encoder or compression function is shown as block 302. Along with the encoding function, the EMG contains another Metadata Complier function 303 that is used to produce Bandwidth Metadata (BWM) associated with the program.

The BWM associated with a program typically will be generated at the facilities of a content provider (e.g., studio, third party source, etc.) or the service provider (e.g., MSO). In one implementation, the EMG function 300 is configured as an original content encoder, wherein uncompressed, losslessly compressed, or lightly compressed content is used as input to the Encoder 302. As will be recognized by those of ordinary skill, many encoding/compression processes are at least partly "lossy" in nature, thereby resulting in some degree of irreversibility in terms of content degradation (i.e., lossy-encoded content cannot be fully recovered). Hence, depending on the use of the content within the network, it may be desirable to either use lossy compression only yet place the lossy compression processes at a stage of the network where degradation or loss of the content quality is not critical, or alternatively use loss-less compression techniques in portions of the network where such degradation is critical or undesired. Lossy techniques advantageously produce significantly smaller file or data sizes, however, and hence are desirable where possible so as to reduce inter alia downstream bandwidth requirements. However, the present invention can readily be adapted to operate with either or both lossy and loss-less compression techniques.

In another implementation, the EMG function 300 is configured to operate during re-encoding (or transcoding) at the facilities of the service provider. The content input to the Encoder 302 in such an implementation will typically be compressed, and the EMG may further process the content to lower bitrate of the content compared to the bitrate of the original encoding at the facilities of the content provider. Such bitrate reduction may be performed by using the BWM data generated at the earlier stage in accordance with the methods previously described herein.

Figure 3B:
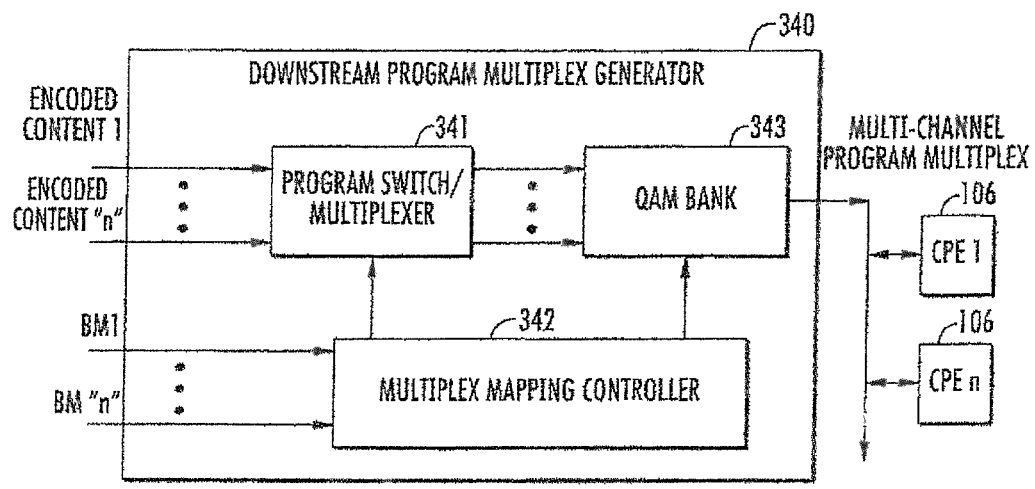
FIG. 3b is a functional block diagram illustrating one exemplary embodiment of a downstream program multiplex generator module in accordance with the present invention.

Referring now to FIG. 3B, a functional block diagram of an exemplary DPMG implementation is shown and described in detail. In the illustration of FIG. 3B, the DPMG is shown to include three functional blocks: a Program Switch/Multiplexer 341 (PSM), a QAM Bank 343, and a Multiplex Mapping Controller 342 (MMC). Multiple encoded content streams (Encoded Content 1 through Encoded Content "n") are input to the PSM 341. The PSM multiplexes these streams under control of the MMC 342, and outputs the re-encoded streams to the QAM bank 343. The QAM bank modulates the re-encoded streams at its input to multiple QAM carriers of the coaxial cable in-band spectrum, and outputs a multi-channel program multiplex suitable for transmission over the coaxial cable.

It should be understood that lines connecting functional blocks in FIGS. 3A and 3B represent logical, not necessarily physical, connections between components. In the illustrated embodiments, the functional blocks 302 and 303 represent program content encoding and associated metadata generation systems that may embody the processes described as steps 200 and 202, respectively. Any number of such encoders may be utilized either serially or in parallel to encode content and generate associated metadata comprising source material for the service provider. The metadata compiler (MC) functions 303 receive the bitrate versus time information from the encoder, and combine it with program identification and other information of the types described above per step 206 of FIG. 2A. The encoded program information may then be conveyed from the encoder to the multiplexer or switch, optionally after first being stored at the service provider facilities (not shown). The conveyance for the encoded program data may comprise, for example, physical or electronic conveyance means such as, for example, a long haul broadband communications network; the same types of media (physical or electronic) may be used to convey the metadata to the facilities of the service provider. Furthermore, a content distribution network may contain multiple DPMG and EMG modules.

As previously noted, the MC may also be disposed at a content source (e.g., third party content provider) where the content is generated, such as in the form of a process running on a computer. The MC may also be distributed or multi-staged, such as where the content source utilizes a first MC to generate certain types of metadata (or perform a portion of the necessary processing to generate the metadata), and the MSO uses a second indigenous MC to add other types of metadata (or complete the aforementioned processing started by the first MC). For example, in one variant, the second or MSO MC might be used to generate network-specific metadata for digestion or use by other MSO network components (e.g., a VOD SRM, BSA switching node, MIMO mux, or the like); this approach advantageously relieves the content source of having to potentially provide network-specific metadata to each different MSO or network operator it delivers to.

Various other permutations of the foregoing functional architecture will be recognized by those of ordinary skill given the present disclosure.

In one variant, the DPMG 340 represents multiplexing systems of the service provider that embody the processes described with reference to step 212 above. The multiplexing as described with reference to step 212 may include for example time division multiplexing (TDM), as represented by PSM functional block 341, followed by frequency-division multiplexing (FDM), as represented by one or more QAM bank 343. It will be recognized, however, that other types and/or combinations of multiplexing may be used depending on the attributes of underlying network and CPE. Hence, the term multiplexing as used herein also includes without limitation any form of so-called "transmultiplexing", such as TDM-to-FDM, or alternatively FDM-to-TDM. Transmultiplexing may also include TDM- or FDM-to-code division multiplexing (CDM), or the converse. Other types of multiple access or separation schemes may also be used, including for example orthogonal frequency division multiplexing (OFDM), which generates a plurality of substantially discrete carriers in the frequency domain. Exemplary TDM-to-FDM multiplexing functions are described in more detail in co-owned U.S. patent application Ser. No. 11/243,720, filed Oct. 4, 2005 and entitled "Self-monitoring and Optimizing Network Apparatus and Methods", issued as U.S. Pat. No. 8,582,584 on Nov. 12, 2013, co-owned U.S. patent application Ser. No. 11/048,334, filed Feb. 1, 2005 and entitled "Apparatus and Methods for Multi-stage Multiplexing in a Network", issued as U.S. Pat. No. 7,602,820 on Oct. 13, 2009, and co-owned U.S. patent application Ser. No. 09/956,688, filed Sep. 20, 2001, entitled "Technique for Effectively Providing Program Material in a Cable Television System" and issued as U.S. Pat. No. 8,713,623 on Apr. 29, 2014, all of which are previously incorporated by reference herein in their entirety.

Multiple functional blocks in FIG. 3*b* may also represent controller subsystems of the service provider that embody the processes described with reference to steps 210 and 212 above. How the MMC 342 may process the bitrate versus time metadata to decide when to allocate bandwidth to the associated programs is previously described herein. Optionally, in the case where PSM 341 represent a multiplexing function only, each multiplexer 341 input may be configurable to accept only some subset of available program streams, and each associated multiplexer output may be statically connected to one QAM input. The MMC 342 may use the metadata to configure the multiplexers 341 to add to (for example, "TDM into") or remove from a given one of their output streams, a program stream, according to current or predicted available capacity of that output.

In the case where the PSM functional blocks 341 represent switch functionality, the MMC 342 may also use the metadata to configure the switches/multiplexers 341 to add to or remove from a given one of the QAM inputs, any available program stream, according to current or predicted available capacity of that QAM input. For example, it may be that each QAM input has the capacity to carry multiple program streams in TDM fashion, in which case the controllers 342 may configure switch output multiplexers within functional blocks 341 of FIG. 3B to add to (e.g., time-multiplex into) or remove from a given one of their output streams, a program stream according to current or predicted available capacity of the associated QAM input. In this case, the functionality of block 341 may be visualized as a switching function followed by a multiplexing function.

The inputs to a PSM 341 and the accompanying MMC 342 may also receive encoded program material and its associated metadata from other content sources (not shown) that provide encoding and metadata generation functionality similar to multiple EMG functional blocks 300. The functional blocks 106 in FIG. 3B represent customer premises equipment (CPE), for example, cable settop boxes, that may convert the program streams to a format suitable for driving the users audio/video (A/V) equipment, which comprises for example, TV sets.

It will also be appreciated that the present invention is compatible with a wideband delivery paradigm, such as e.g., that described in co-owned and co-pending U.S. patent application Ser. No. 11/013,671 filed Dec. 15, 2004 and entitled "Method and Apparatus for Wideband Distribution of Content" which is now published as U.S. Patent Application Publication No. 2006/0130113, and incorporated herein by reference in its entirety. For example, the content associated with one or more program streams (or DOCSIS data streams) is distributed across two or more QAMs which is then recovered using CPE 106 having one or more wideband tuners. Other such approaches where content streams are delivered over multiple QAMs may also be used consistent with the invention.

In some systems, bitrate versus time metadata may be generated "on the fly", i.e., as program material is encoded, and conveyed immediately thereafter to the controllers like the illustrated controller 342, in a manner like that described in co-owned U.S. patent application Ser. No. 11/048,334, entitled, "Apparatus and Methods for Multi-Stage Multiplexing in a Network", issued as U.S. Pat. No. 7,602,820 on Oct. 13, 2009, previously incorporated herein by reference in its entirety. In such systems, the encoded program material may be delayed long enough using e.g., first-in-first-out (FIFO) type buffer storage or another delay mechanism before multiplexers 341, so that the controllers 342 have sufficient time to decide how to allocate the program streams before they actually arrive at the multiplexer inputs. This real-time approach may also support the use of metadata such as that described herein to allocate bandwidth for "live" program streams in cases where, e.g., a few seconds or minutes delay of the "live" streams may be acceptable (versus the deterministic models described herein, where the metadata is typically generated significantly in advance of program stream delivery).

In some exemplary implementations, the switch/multiplexer and/or controller is located at regional or divisional cable TV headends, entry points to long haul communication links, TV studio uplinks, national programming distributions centers, distributions hubs, or any other locations where it is useful to be able to manage bandwidth using switch/multiplexers.

In the context of the previously described BSA network, program feeds are typically delivered in real time (or very nearly real time), and hence in order to implement a bandwidth metadata generation function in situ, a delay would need to be imposed so as to allow time for the generation before the program stream is propagated further downstream in the network. Hence, in such an application, a better solution is to utilize the program or content sources outside the MSO network to generate and provide the BWM. Accordingly, under such an approach, no such delay need be imposed, since the "real time" content arrives with its metadata already in place (or otherwise available from another source). Ideally, the metadata should arrive before the start of the actual program data flow in order to be most effective, but the present invention contemplates the situation where deterministic metadata is generated in advance but delivered after start of the program flow, or even in a "just in time" manner.

However, in the context of a VOD or other non-real time implementation, no such delay is needed, since the programs available for on-demand selection are encoded and stored in advance along with their associated BWM. VOD and similar non-real time implementations are less transient by nature as well; i.e., subscribers generally start the VOD session, continue to watch it (and perhaps pause or rewind, etc. periodically according to a trick mode or PVR function), and then terminate their viewing of that program. In contrast, broadcast paradigms such as BSA involve a much greater degree of variability due to inter alia subscriber channel changes and "channel hopping". Hence, the gains in efficiency that can be obtained by the application of the methods and apparatus of the present invention to a VOD or other less transient implementation are prospectively greater than those for broadcast architectures, since subscriber behavior and instantaneous program bitrate variations are both well-behaved.

Example: Re-Multiplexing Programs

Figure 4:
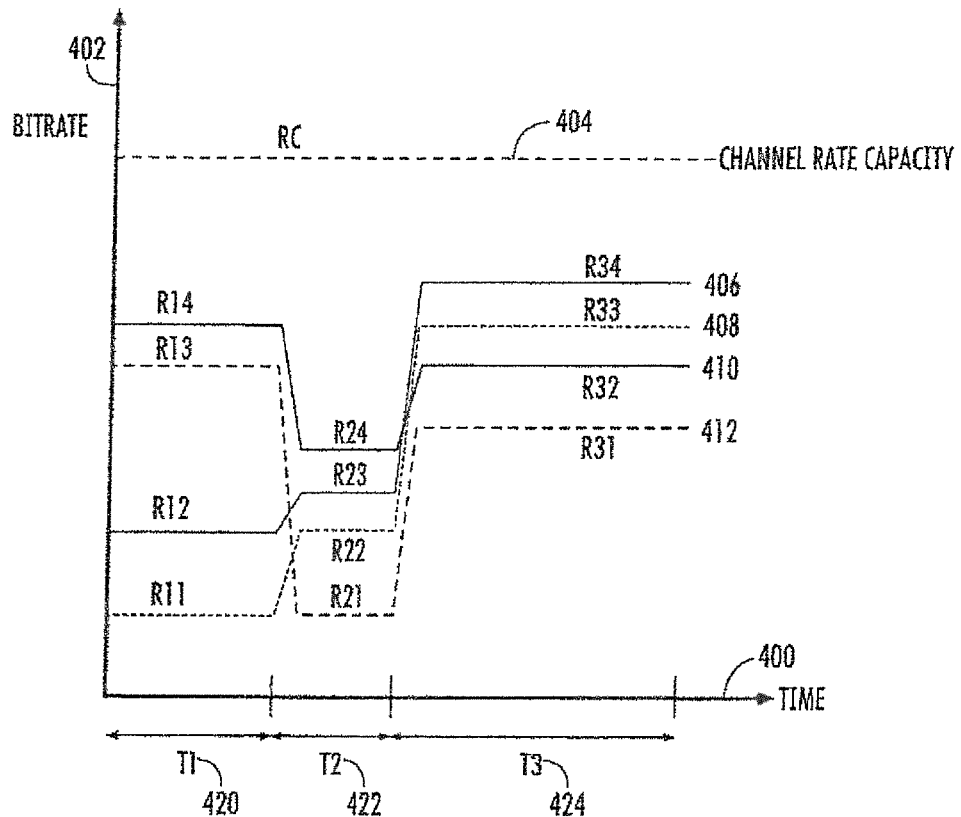
FIG. 4 is an X-Y chart showing bitrate versus time variations of two programs in a multiplex useful with the present invention.

The principles of the present invention are further illustrated by the following discussion of an exemplary embodiment. FIG. 4 shows a simplified example of the instantaneous bitrate requirements of a plurality (here, two) programs in a program multiplex as a function of time. The Y-axis 402 of FIG. 4 represents bitrate and the X-axis 400 represents time. The X-axis 400 is divided into three time intervals: T1 420, T2 420 and T3 424. The time variation of instantaneous bandwidth of the first incoming stream (Program1) is shown by trace 406 of FIG. 4, and the corresponding BWM that carries the information about minimum instantaneous bandwidth is shown by trace 408. Similarly, the time variation of instantaneous bandwidth of the second incoming stream (Program2) is shown by trace 410, and the corresponding BWM that carries the information about minimum instantaneous bandwidth is shown by trace 412. The total bandwidth available to the combined multiple of these two streams is indicated (line 404) and has the value RC.

Case 1: Actual Bitrates Exceed Channel Capacity (and Minimum Bitrates do not)

In interval T1 420 of FIG. 4, the incoming bitrate of the first stream is R12 and the incoming bitrate of the second stream is R14. Note that the sum of these two bitrates (R14+R12) is more than the channel rate capacity RC. Therefore, the multiplexer will have to reduce the rate of one or both these streams. The multiplexer can then use the minimum bandwidth data available for the incoming streams; in this case R11 on trace 408 indicates the minimum acceptable bandwidth for Program1, and R13 on trace 412 indicates the minimum acceptable bandwidth for Program2. In the example shown, these two bandwidths add up to less than RC. Therefore, it is possible for the multiplexer to multiplex these two streams at their minimum possible bandwidths (or some bandwidth higher than the minimum bandwidth) and have some bandwidth left over for opportunistic (e.g., secondary or non-time critical content insertion) or other services.

In general, when the multiplexer has to multiplex and rate reduce several streams, the task of picking an appropriate reduced rate for each stream can be computationally intensive. Accordingly, in some embodiments, it may be advantageous to utilize other types of data to selectively reduce or manage the processing overhead. One such approach comprises the overlay or inclusion of data relating to predicted bandwidth consumption, viewership, etc. See, e.g., co-owned U.S. patent application Ser. No. 11/800,093 filed May 3, 2007, entitled "Methods and Apparatus for Predictive Capacity Allocation" and issued as U.S. Pat. No. 9,398,346 on Jul. 19, 2016, which is incorporated herein by reference, for exemplary predictive bandwidth models and techniques. Using such information, bandwidth may for example be reduced for programming content which has less overall predicted viewership. For instance, certain types, genre, or even individual programs may be more popular at certain times of day or on certain dates as compared to others, and therefore may be allocated greater bandwidth at the expense of reduced bitrate for the less popular ones. This approach also has the advantage of providing the best possible transmission quality to the largest number of viewers at any given time; i.e., bandwidth allocation is performed based on optimizing quality for the largest number of subscribers.

However, QoS floors and/or ceilings can be imposed as needed so as to prevent an undesirable level of degradation; e.g., preventing any given stream from assuming a reduced bitrate that is associated with marked degradation of picture or other quality. Stated simply, there comes a point where the program quality is useless or even irritating for a viewer, and delivery of such reduced-rate content will likely serve to only alienate or frustrate subscribers viewing those programs (albeit a smaller fraction of the total viewing population at that time). Use of QoS limits imposes restrictions intended to avoid such situations, while still accommodating the techniques of the present invention (including dynamic use of metadata to rate-shape or otherwise control the multiplexing of multiple program streams or other content).

Any number of other allocation algorithms may be utilized consistent with the invention for the reduction of bitrates on one or more streams in a given transmission channel. For example, one such alternative comprises allocating based on profit (e.g., avoiding reducing bitrate on program streams that have the highest percentage of revenue-producing advertising, or alternatively those that have the lowest percentage of advertising under the theory of maximizing subscriber pleasure with best quality and fewest advertisements) or operational considerations, or even on a random or scheduled basis. Reduced rates may also be imposed based on programming type; e.g., on all SD programming before HD programming (if any) is degraded.

Case 2: Actual Bitrates Below Channel Capacity

In interval T2 of FIG. 4, the collective bandwidth used by both streams (R22+R24) in the multiplex is less than the bandwidth available. In this case, the multiplexer may pass both the streams without changing their bitrates or may decide to reduce bitrates by taking into account the minimum bandwidths R22 for Program1 and R21 for Program2. As previously mentioned, the network operator can configure multiplexer in a variety of different ways to either use minimum bitrates, or use a bitrate between the minimum bitrate and instantaneous bitrate or otherwise.

Case 3: Minimum Bitrates Exceed Channel Capacity

In interval T2, the bitrates used by the programs are such that not only do the instantaneous bitrate requirements (R34 for Program1 and R32 for Program2) exceed the channel capacity, but the minimum bandwidths for the programs add up to more than the channel capacity as well. In other words, R33+R31 is greater than channel capacity RC. In such a case, it is evident that the multiplexer cannot fit both programs into the same channel unless it performs severe rate reduction on one or both programs. The multiplexer may instead choose to switch programs such that one or both programs may be sent to different channels where they can be accommodated to meet their QoS requirements.

Time-Shifted Encoding and Other Variants—

The present invention also advantageously lends itself to re-encoding content at different times instead of (or even in conjunction with) at different locations in a content distribution network. As one example, a content provider may create a "master copy" of a program by encoding it at a relatively high bitrate, and also gather bitrate metadata (e.g., a bitrate versus time profile) during the encoding process. This metadata may be archived and used subsequently to stream the content to fit available outbound bandwidth for the program. The outbound bandwidth may be fixed (e.g., CBR output), or change with time and network conditions (VBR or the like). Each encoding/multiplexing process can use this information initially stored. Data from multiple programs that are known to require multiplexing can also be considered simultaneously, so as to optimize, e.g., picture quality across all of the programs as opposed to rate-reducing or clamping one program in the multiplex only.

The BWM generated according to the methods of present invention may also be used to convey additional visual quality information about the associated program. The BWM may indicate e.g., multiple acceptable resolutions for the content and a corresponding set of acceptable bitrates. For example, in one time segment, the BWM may contain information indicating that the program can be encoded as a high definition (HD) program at 10 Megabits/second peak and 6 Megabit/second minimum. In another time segment, the BWM may contain information indicating that the program may be encoded as high definition at the above rates, and also as standard definition at 4 Megabits/second peak and 2 Megabits/second minimum rate. Such information can be used to down-sample the content to the appropriate resolution. This downsampling function can be implemented in PSM 341 of FIG. 3B, may be implemented as a separate functional block under control of the MMC 342, or using yet other approaches known to those of ordinary skill.

Figure 5:
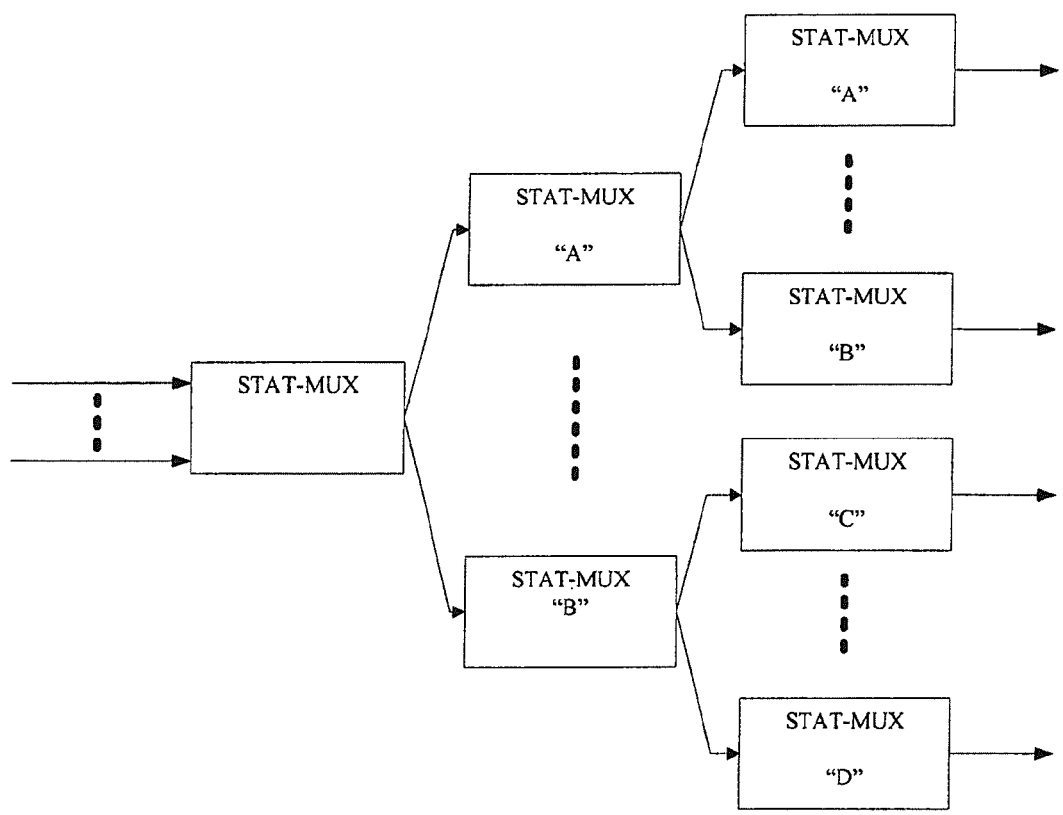
FIG. 5 shows a functional block diagram of a prior art multi-stage multiplexing scheme.

FIG. 5 shows functional block diagram of an exemplary multi-stage multiplexing configuration useful with the present invention, as described in the above-mentioned co-owned U.S. patent application Ser. No. 11/048,334 to Helms et al., filed Feb. 1, 2005, and entitled "APPARATUS AND METHODS FOR MULTI-STAGE MULTIPLEXING IN A NETWORK", issued as U.S. Pat. No. 7,602,820 on Oct. 13, 2009, the contents of which incorporated by reference herein in its entirety. This application discloses inter alia methods and apparatus for performing multiplexing of "real time" video or other content (e.g., programs) within a network using feed-back from a subsequent digital program insertion stage, and/or feed-forward information from a prior multiplexing stage. In one embodiment, the network comprises a hybrid fiber coax (HFC) cable network having headend and hub-based multiplexing stages, and communication between the two stages is used to improve the visual quality performance and bandwidth utilization of the output multi-program stream during conditions where downstream content is inserted into the transport stream.

Network Apparatus—

Figure 6:
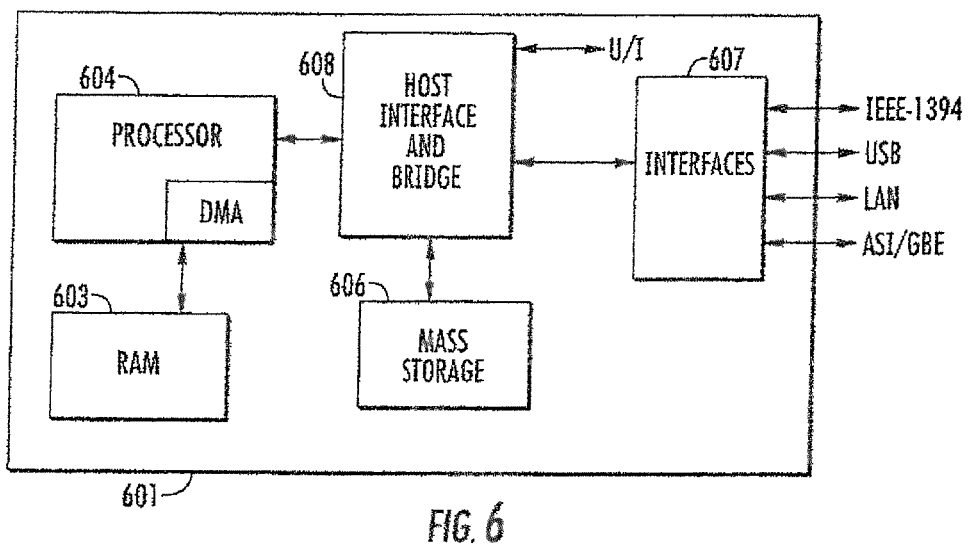
FIG. 6 is a block diagram illustrating one embodiment of a network device according to the present invention.

Referring now to FIG. 6, one embodiment of an improved network device 601 incorporating a Metadata Compiler and/or a Multiplex Mapping Controller according to the present invention is shown and described in detail. This device might comprise, for example, the DPMG 300 of FIG. 3B, the MEM 162 of FIG. 1a, or even a server or other device (e.g., BSA switch controller, part of a staging processor disposed at the headend of FIG. 1a that parses out content and stores it, etc.) within the network. In one variant, the device 601 comprises an OCAP (OpenCable) compliant BSA network switching controller module adapted for use at the hub site of FIG. 1c or another location within the network (such as the headend 150). In another variant, the MMC is part of the session resource manager (SRM) of the extant VOD infrastructure.

The exemplary device 601 of FIG. 6 comprises a digital processor(s) 604, RAM 603, mass storage device 606, host interface and bridge 608, and a plurality of interfaces 607 for use with other network apparatus such as QAM combiners, IP routers and other packet network devices, network management and provisioning systems, local PCs, etc. Other components which may be utilized within the device 601 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required. These components and functionalities are well known to those of ordinary skill in the cable and embedded system fields, and accordingly not described further herein.

The device 601 of FIG. 6 may take any number of physical forms, comprising for example one of a plurality of discrete modules or cards within a larger network headend, edge or hub device of the type well known in the art. The device 601 may also comprise firmware, either alone or in combination with other hardware/software components such as those previously described (e.g., disposed in the aforementioned headend or edge device). Alternatively, the module 601 may be a stand-alone device disposed at the headend, hub or other site, and may even include its own RF front end (e.g., modulators, multiplexers, encryptors, etc.) or optical interface so as to interface directly with various portions of the HFC network 101. Numerous other configurations may be used. The device 601 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the encoding, metadata generation, and multiplexing analysis and control functionality described above may take the form of one or more computer programs. Alternatively, such computer programs may have one or more components distributed across various hardware environments at the same or different locations, such as where these logical processes are distributed across multiple platforms at the hub site and/or the headend 150.

As yet another example, portions of the functionality may be rendered as a dedicated or application specific IC having code running thereon. Myriad different configurations for practicing the invention will be recognized by those of ordinary skill in the network arts provided the present disclosure.

Operations/Business Rules Engine and Methods—

In another aspect of the invention, the aforementioned BWM generation and multiplex control processes (e.g., rendered as one or more computer programs) optionally include a business/operations rules engine. This engine comprises, in an exemplary embodiment, a series of software routines running on the device 601 (FIG. 6) or other associated hardware/firmware environment adapted to control the operation of the MC (or EMG), MMC (or DPMG), and/or related components. These rules may also be fully integrated within the BWM generation and MMC processes, and controlled via e.g., a GUI on a PC connected to the device 601, or even remotely or automatically. In effect, the rules engine comprises a supervisory entity which monitors and selectively controls, via the MC or MMC, BWM generation and multiplex process functions at a higher level, so as to implement desired operational or business rules. The rules engine can be considered an overlay of sorts to the algorithms previously described. For example, the MC or MMC processes may invoke certain operational protocols or decisions based on data received from various sources (e.g., program or content sources, BWM received at the MMC (FIG. 3B), as well as network operational data, demographic data, geographic data, etc. However, these processes may not always be compatible with higher-level business or operational goals, such as maximizing profit, QoS concerns, or system reliability. Hence, when imposed, the business/operational rules can be used to dynamically (or manually) control the operation of the MC and/or MMC processes, in conjunction with the operational "recommendations" typically generated as previously described.

For example, one rule implemented by the rules engine may comprise selectively rescheduling latent (e.g., non-time sensitive, or trickle) deliveries for a time when actual or anticipated bandwidth requirements (as indicated by BWM data for example) or predicted demand do not closely approximate network capacity (e.g., identifying such conditions in real time, and then commencing the delivery), thereby providing all available capacity for servicing real-time demands (and hence prospectively avoiding degradation of subscriber satisfaction). Such deliveries may be scheduled for periods when the anticipated or predicted bandwidth needs are significantly lower than actual capacity, thereby increasing the availability of "wasted" bandwidth that can be used by opportunistic modes.

Another exemplary business rule may comprise selectively treating classes or aggregations of subscribers within the network differently than others. For instance, "premium" subscribers may be identified to the DPMG or MMC such that given the choice of rate-reducing two or more programs in response to e.g., BWM generated by the MC, those program being viewed by one or more premium subscribers would not be rate-reduced. In one variant, an approach similar to that used in the aforementioned BSA network of FIG. 1c for identifying programs which are not being watched by any subscribers is used (in conjunction with data associating a subscriber's CPE ID, TUNER ID MAC, or opaque variable; see e.g., the exemplary methods and apparatus of co-owned and co-pending U.S. patent application Ser. No. 11/186,452 filed Jul. 20, 2005 and entitled "METHOD AND APPARATUS FOR BOUNDARY-BASED NETWORK OPERATION", which is published as U.S. Patent Application Publication No. 2007/0022459 and is incorporated herein by reference in its entirety) to identify which of a the two or more programs being considered for selective rate reduction are presently being watched by one or more premium subscribers at any given time (or which program is being watched by more subscribers), although other approaches may be used as well. By invoking this rule, premium subscribers are assured of having the best quality of service at all times (at least with respect to possible rate reductions).

Similarly, in the aforementioned BSA environment, another rule might comprise selectively dropping or switching out programs from the multiplex that are not being watched in any location served by that multiplex. As described above, the concept of BSA is typically applied at the hub level, such that the decision to switch out delivery of a program stream or channel is made based on just a portion of the total subscriber base that might be watching that stream or channel. However, when applied at the multiplex level, program streams or channels may be selectively dropped from the multiplex if no one in the service area serviced by that multiplex is watching that channel.

Another rule might comprise selectively rate-reducing those streams or channels that have a desirable profit or subscriber satisfaction metric that is less than another stream or channel. For example, one such metric comprises advertising content per unit time; an MSO may determine that more heavily advertising-laden channels produce higher advertising revenue, and hence the MSO would desire to keep those channels insulated from rate-reduction or being switched out than others. Similarly, HD or SD may be used as a basis for selection or differentiation; e.g., keeping a certain segment of the subscriber population happy, such as those with HD-capable receivers.

In another aspect, the present invention provides a method to a service provider to enforce QoS by controlling the visual quality of programs. The method uses visual quality information generated during encoding of a relatively high visual quality input; multiplexing and switching functions downstream can benefit from this metadata to intelligently decide how much to reduce the rate of a program by, and/or how to efficiently map programs to multiplexes or QAM carriers to ensure good visual quality for each program in the multiplex.

Another benefit of the methodology of the present invention is that the business agreement between a content provider and a service provide can now rely on tangible data. For example, a service agreement between a content provider (e.g., studio or content network) and a service provider (e.g., MSO) can be specified in the form of segment-wise minimum, instantaneous and maximum bandwidths in the form of BWM associated with the program, such as by an MC operating at the content source. The service provider can then in turn pass this information to the functional blocks described in the present invention (e.g., MMC of the DPMG) to ensure that the program gets the bitrate per the relevant QoS agreement. This approach assures the content provider that their valuable content (e.g., first-run television, movies, etc.) will be presented with a minimum QoS or better, thereby avoiding situations where subscribers associate low or insufficient QoS with the content provider (versus the service provider). For example, viewers of an NBC made-for-TV movie might associate poor quality with NBC (versus the cable service provider) if the movie is presented with deficient QoS.

For auditing purposes, the service provider can also produce segment-wise instantaneous bandwidth information about a program as it was actually carried over the network to the users. This information can be provided (or even sold) to e.g., the content provider, third parties, etc. These techniques allow operators a new way of offering carriage over their networks.

Furthermore, the present invention lends itself to a look-ahead processing of bandwidth requirement such that the service provider can re-map programs on different QAM carriers, when a significant change in bitrates needed by individual programs within the multiplex is upcoming. This process can also be performed well in advance of the actual use or multiplexing of the content within the network. For example, the present invention contemplates the use of computer software or other such mechanisms to optimize program stream/QAM mapping in advance, based on bitrate profiles for the constituent program streams. Hence, multiplexes can be "designed" and optimized well in advance of broadcast or transmission, as opposed to largely "on the fly" optimization as previously described, which may or may not produce an optimal solution given time and/or processing constraints.

Moreover, using the foregoing multiplex design methodologies, the effects of certain adjustments or allocations in one portion of the MSO network on other portions of the broader network can be modeled. Specifically, in some instances, actions taken by one EMG or DPMG (and constituent MCs or MMCs) may have effects on other such EMGs or DPMGs in the broader network, such as by constraining or reducing necessary resources for the latter, or causing competition between different sub-portions or components. These larger-scale interactions and effects can be modeled in advance, such as via the aforementioned software using the BWM and other relevant data, so as to: (i) identify any undesired effects, transients, or competition for resources, and (ii) optimize on a network level.

In another variant, a library or database of various different encodings of a particular content element may be maintained by a content provider (or third party, or even the service provider themselves) such that the service provider can pick the optimal encoding for the particular multiplex being created or designed. For example, encodings in MPEG-2, 4, and VC-1 formats might be maintained, each having a somewhat different bitrate profile. The service provider (or content source) can then select the best option based on the requirements provided by the service provider.

It will also be appreciated that converse to the foregoing, the service provider can specify bandwidth or similar profiles or requirements to the content provider. In one embodiment, these specified profiles are generated based on the aforementioned computer modeling, but this is by no means a requirement. For example, through modeling analysis, the service provider may know that program streams with large and frequent changes in instantaneous bitrate are less easily handled (or less efficiently utilized) by their network than program streams with more gentle changes. This may be the case even where the integrated total bandwidth (i.e., the instantaneous bandwidth integrated over the program stream duration) for the former stream is identical to that of the latter, more gently-changing stream, due to e.g., the inability of the MMC or other processes to "catch up" to or compensate for the rapid changes in bitrate (even when provided in advance in the form of BWM). Processing by the MMC or other such processes in the network occurs at finite speed, and can be substantially intensive from a computational perspective, and hence as a general rule slower changes are more readily accommodated than rapid changes.

Hence, given the foregoing, the service provider may specify one or more criteria to its content providers; e.g., no more than X % per second instantaneous bandwidth rate change, etc., so as to attempt to have the content providers (and any encoders they are using) provide content that is optimized for that particular network infrastructure or operational constraints. This can also be accomplished in a substantially dynamic approach; e.g., such as where the service provider feeds data to the encoders of the content source regarding network requirements, restrictions, profiles, etc., and the encoders encode the program stream(s) so as to: (i) observe the content provider's QoS or other requirements, and also (ii) attempt to optimize the MSO's network operation. This process can be accomplished for example using software running at the encoder in a "look ahead" fashion.

Figure 7:
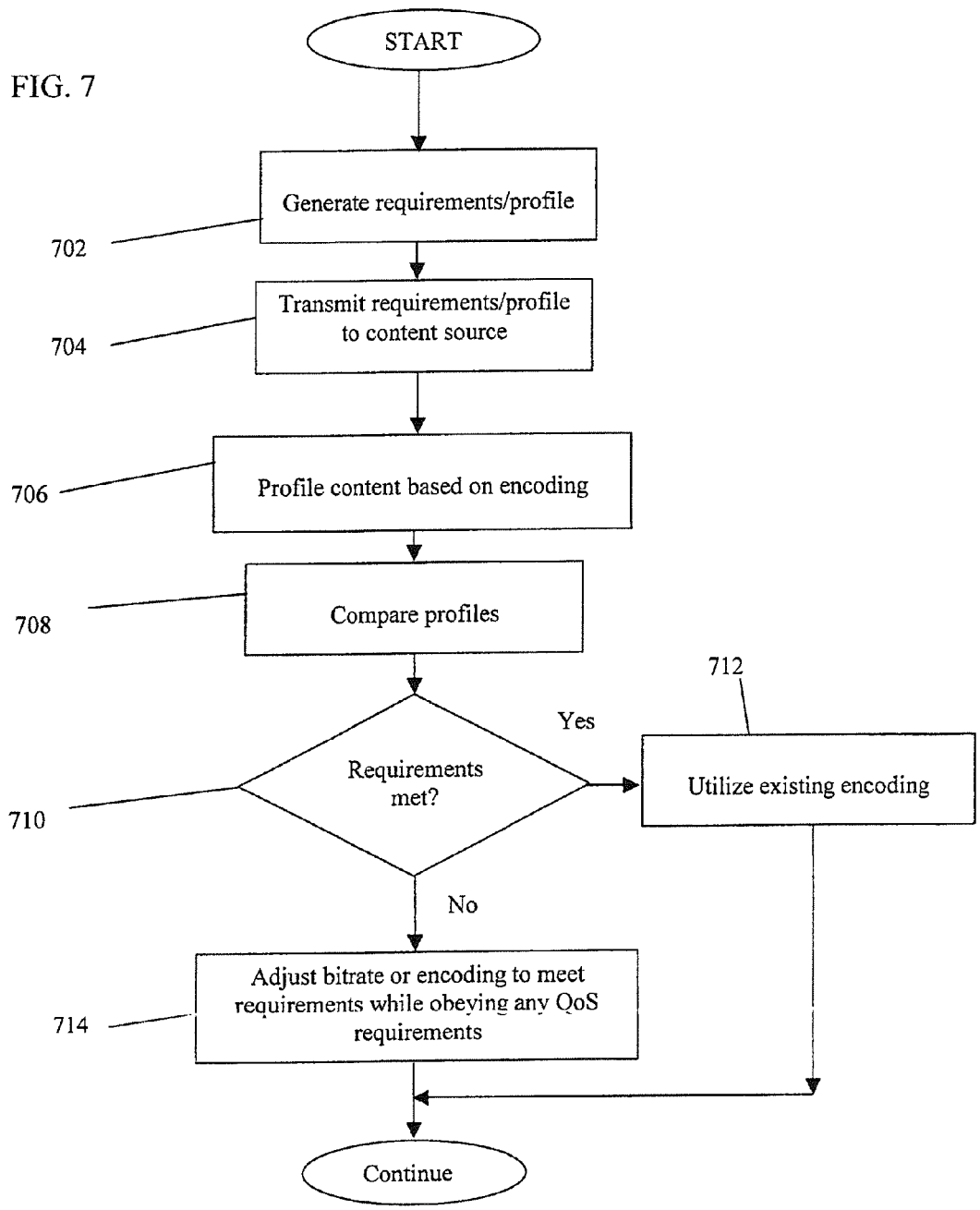
FIG. 7 is a logical flow diagram illustrating one exemplary method of dynamically encoding information based on network requirements in accordance with the present invention.

For example, one embodiment of the invention comprises the following methodology (FIG. 7). First, the service provider generates a requirements list or profile (step 702), and transmits this to the content source (step 704). The content source then bitrate-profiles the content stream in question (e.g., a movie) according to a proposed encoding scheme per step 706, and compares this to the requirements received in step 704 (step 708). If the bitrate profile of the content is enveloped by the MSO criteria, then no further adjustment is necessary (step 710), and the content provider can encode the content according to the scheme (or if already encoded, leave it as is) per step 712. However, if the bitrate profile exceeds or violates the MSO criteria, then selective adjustment before encoding (or re-encoding of already-encoded content) can be performed (step 714), subject to maintaining minimum QoS or similar criteria specified by the content provider. The foregoing process can all be accomplished before delivery of the encoded content to the MSO (e.g., in advance of multiplexing, or even a "just in time" fashion).

It is also envisaged that these MSO-generated criteria or requirements can be varied dynamically (e.g., in real time or near-real time), such as in a look-ahead fashion. For example, while the previously described embodiment of FIG. 7 specifies generally static criteria (e.g., "avoid having instantaneous bitrate changes greater than X % per second"), these criteria can be analyzed by the MSO based on projected multiplexes some time in the near future. An MSO might know its program lineup for a given time period, and hence accordingly can generate a prospective multiplex/stream mapping in advance, and also generate criteria or requirements which will optimize that prospective multiplex. This can be fed back to one or more of the content sources to adjust their encoding as previously described. However, the requirements or criteria for an optimal multiplex might change as a function of time (such as due to changes in subscriber demand, operational or maintenance issues, equipment failures, breaking news, etc.), and hence require adjustment where practical by the content encoding process.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. An apparatus comprising a storage non-transitory computer readable medium configured to store a computer program thereon, said computer program comprising a plurality of instructions which are configured to, when executed by a processor apparatus:

receive bandwidth metadata associated with a plurality of content to be distributed within a content distribution network;

project, based at least in part on said bandwidth metadata, a required bandwidth within said content distribution network at a future period;

perform bandwidth allocation within said content distribution network for said plurality of content based at least in part on said projection;

cause construction of one or more multi-channel program multiplexes, said one or more multi-channel program multiplexes configured to deliver at least one of said plurality of content to one or more client devices; and enable or disable one or more clamp functions on an amount or type of said at least one of said plurality of content to be added to said one or more multi-channel program multiplexes; wherein said one or more clamp functions comprise a reduction of a maximum bit rate of said at least one of said plurality of content.

2. The apparatus of claim 1, wherein said bandwidth metadata comprises at least allocation capacity requirements and/or allocation demand requirements.

3. The apparatus of claim 1, wherein said plurality of instructions are further configured to, when executed, use said bandwidth metadata to project a bandwidth allocation for a second content to be included in said one or more multi-channel program multiplexes.

4. The apparatus of claim 3, wherein said plurality of instructions are further configured to, when executed, use said bandwidth metadata to project a maximum bandwidth value at said future period for said second content to be included in said multi-channel program multiplex in order to accommodate higher bandwidth content.

5. The apparatus of claim 1, wherein said plurality of instructions are further configured to, when executed by said processor apparatus, adjust one or more settings of said one or more multi-channel program multiplexes.

6. The apparatus of claim 1, wherein said bandwidth metadata comprises a plurality of information which relate to a bitrate of said plurality of content over a given time period.

7. The apparatus of claim 1, wherein said plurality of instructions are further configured to, when executed, use said bandwidth metadata to project allocation of at least one or more content streams within said plurality of content across various carriers such that a capacity of each carrier is not exceeded at said future period.

8. The apparatus of claim 7, wherein said plurality of instructions are further configured to, when executed, use said bandwidth metadata to project at least a switch of at least one content stream comprising said plurality of content from a first carrier to a second carrier.

9. The apparatus of claim 7, wherein said plurality of instructions are further configured to, when executed, use said bandwidth metadata to perform a re-allocation of said bandwidth allocation within said network for said plurality of content after a transmission of said content stream has begun.

10. The apparatus of claim 9, wherein said re-allocation comprises a transfer of said content stream from a first carrier to a second carrier.

11. The non-transitory computer readable apparatus of claim 1, wherein said at least one of said plurality of content to be added to said one or more multi-channel program multiplexes is added based at least part on a particular subscriber that requested said one or more of said at least one of said plurality of content.

12. A method of optimizing operation of a network, comprising:

receiving bandwidth metadata;

predicting a bandwidth demand for at least a first future time via a server apparatus;

determining, via said server apparatus, an actual bandwidth required by at least one program at said first future time, said at least one program being a part of a multiplex, said multiplex being delivered over at least one of a plurality of quadrature amplitude modulated (QAM) channels; and adjusting, via said server apparatus, an allocation of said at least one program across one or more of said plurality of QAM channels based at least in part on said predicted bandwidth at said first future time and said determined actual bandwidth at said first future time;

using said bandwidth metadata to perform a re-allocation of said one or more of said plurality of QAM channels after a transmission of said multiplex has begun, wherein said re-allocation is performed in accordance with one or more quality of service (QoS) floor requirements, said one or more floor requirements comprising one or more requirements to maintain at least portions of said at least one program at or above a prescribed level of picture quality.

13. The method of claim 12, wherein said act of predicting and said act of determining are based at least in part on said bandwidth metadata, said bandwidth metadata comprising information relating to a bitrate over time of said at least one program versus time metadata.

14. The method of claim 12, wherein said act of predicting and said act of determining are based at least in part on said bandwidth metadata, said bandwidth metadata comprising information relating to operational parameters of a second network with respect to bandwidth capacity and/or bandwidth demand.

15. The method of claim 12, wherein said bitrate at which said at least one program is transmitted comprises a prescribed maximum bitrate during said first future time in order to accommodate higher bitrate content.

16. The method of claim 12, wherein said re-allocation of said at least one program across one or more of said plurality of QAM channels further comprises switching said allocation of said at least one program from a first QAM channel to a second QAM channel.

17. The method of claim 12, further comprising evaluating one or more bandwidth demand peaks, and based at least in part on said evaluation, adjusting an amount of bandwidth required to support said multiplex.

18. A method of operating a content distribution network having both a content source and at least one service provider, said method comprising:

identifying at least one criterion which enhances efficiency of at least one multiplexing process of said network via a server apparatus;

providing said at least one criterion which enhances efficiency of said at least one multiplexing process of said network to said content source via said server apparatus;

causing said content source to encode at least one content element so as to comply with said at least one criterion which enhances efficiency of said at least one multiplexing process of said network prior to said content source providing said at least one content element to said at least one multiplexing process; and receiving metadata relating to said at least one content element from said content source via said server apparatus.

19. The method of claim 18, further comprising generating a content multiplex comprising said at least one content element and at least one other content element based at least in part on said metadata.

20. The method of claim 18, wherein said act of causing said content source to encode said at least one content element so as to comply comprises adjusting a bitrate of said encoding.

21. A content distribution system configured to transmit a plurality of programs over a network, comprising:
- encoder apparatus configured to generate said plurality of programs; and
- a multiplexing apparatus, said multiplexing apparatus configured to receive said plurality of programs generated by said encoder apparatus;
- wherein said encoder apparatus and said multiplexing apparatus communicate through at least one signal path, said communication comprising information used by said multiplexing apparatus to create an output multiplex; and
- wherein said at least one signal path is further configured to deliver metadata related to at least one of a minimum and/or a maximum acceptable bandwidth for at least one of said plurality of programs to said multiplexing apparatus;
- wherein said encoder apparatus is further configured to encode said at least one of said plurality of programs so as to comply with at least one criterion determined to enhance efficiency of at least one multiplexing process of said network prior to said encoder apparatus providing said at least one of said plurality of programs to said multiplexing apparatus.

22. The content distribution system of claim 21, wherein said encoder apparatus is disposed at a headend of said network.

23. The content distribution system of claim 22, wherein said multiplexing apparatus is disposed at a distribution hub of said network.

24. The content distribution system of claim 21, wherein said at least one signal path comprises an in-band feed-forward path.

25. The content distribution system of claim 21, wherein said multiplexing apparatus further comprises a switching apparatus configured to switch at least one of said programs to an output port thereof, said output port configured to carry a program stream for modulation over a single RF channel.

26. The content distribution system of claim 21, wherein said at least one criterion comprises a maximum of a certain percentage of instantaneous bandwidth rate change.

27. A method of optimizing operation of a network, comprising:
- receiving bandwidth metadata comprising information relating to a bitrate over time of at least one program versus time metadata;
- based at least in part on said bandwidth metadata, predicting a bandwidth demand for at least a first future time via a server apparatus;
- determining, via said server apparatus, an actual bandwidth required by said at least one program at said first future time, said at least one program being a part of a multiplex, said multiplex being delivered over at least one of a plurality of quadrature amplitude modulated (QAM) channels;
- based at least in part on said predicted bandwidth at said first future time and said determined actual bandwidth at said first future time, projecting at least one switch of said at least one of a plurality of QAM channels from a first carrier to a second carrier; and
- using said bandwidth metadata to perform said at least one switch of said at least one of said plurality of QAM channels after a transmission of said multiplex has begun, wherein said at least one switch is performed in accordance with one or more quality of service (QoS) floor requirements, said one or more floor requirements comprising one or more requirements to maintain at least portions of said at least one program at or above a prescribed level of picture quality.

* * * * *

UNITED STATES PATENT AND TRADEMARK OFFICE
CERTIFICATE OF CORRECTION

PATENT NO. : 9,706,234 B2
APPLICATION NO. : 14/148591
DATED : July 11, 2017
INVENTOR(S) : Remi Rieger et al.

It is certified that error appears in the above-identified patent and that said Letters Patent is hereby corrected as shown below:

In the Claims

Currently reads (Claim 1 – Columns 36-37):
"1. An apparatus comprising a storage non-transitory computer readable medium configured to store a computer program thereon, said computer program comprising a plurality of instructions which are configured to, when executed by a processor apparatus:
receive bandwidth metadata associated with a plurality of
    content to be distributed within a content distribution
    network;
project, based at least in part on said bandwidth metadata,
    a required bandwidth within said content distribution
    network at a future period;
perform bandwidth allocation within said content distribution network for said plurality of content based at
    least in part on said projection;
cause construction of one or more multi-channel program
    multiplexes, said one or more multi-channel program
    multiplexes configured to deliver at least one of said
    plurality of content to one or more client devices; and
enable or disable one or more clamp functions on an
    amount or type of said at least one of said plurality of
    content to be added to said one or more multi-channel
    program multiplexes; wherein said one or more clamp
    functions comprise a reduction of a maximum bit rate
    of said at least one of said plurality of content."

Signed and Sealed this
Third Day of October, 2017

Joseph Matal
*Performing the Functions and Duties of the*
*Under Secretary of Commerce for Intellectual Property and*
*Director of the United States Patent and Trademark Office*

Should read (Claim 1 – Columns 36-37):
--1. An apparatus comprising a non-transitory computer readable storage medium configured to store a computer program thereon, said computer program comprising a plurality of instructions which are configured to, when executed by a processor apparatus:
receive bandwidth metadata associated with a plurality of
    content to be distributed within a content distribution
    network;
project, based at least in part on said bandwidth metadata,
    a required bandwidth within said content distribution
    network at a future period;
perform bandwidth allocation within said content distri-
    bution network for said plurality of content based at
    least in part on said projection;
cause construction of one or more multi-channel program
    multiplexes, said one or more multi-channel program
    multiplexes configured to deliver at least one of said
    plurality of content to one or more client devices; and
enable or disable one or more clamp functions on an
    amount or type of said at least one of said plurality of
    content to be added to said one or more multi-channel
    program multiplexes, wherein said one or more clamp
    functions comprise a reduction of a maximum bit rate
    of said at least one of said plurality of content.--

Currently reads (Claim 11 – Column 37):
"11. The non-transitory computer readable apparatus of claim 1, wherein said at least one of said plurality of content to be added to said one or more multi-channel program multiplexes is added based at least part on a particular subscriber that requested said one or more of said at least one of said plurality of content."

Should read (Claim 11 – Column 37):
--11. The apparatus of claim 1, wherein said at least one of said plurality of content to be added to said one or more multi-channel program multiplexes is added based at least part on a particular subscriber that requested said one or more of said at least one of said plurality of content.--